United States Patent
Haga et al.

(10) Patent No.: US 8,307,354 B2
(45) Date of Patent: Nov. 6, 2012

(54) PROGRAM CREATION DEVICE, PROGRAM TEST DEVICE, PROGRAM EXECUTION DEVICE, INFORMATION PROCESSING SYSTEM

(75) Inventors: Tomoyuki Haga, Nara (JP); Yukie Shoda, Osaka (JP); Taichi Sato, Osaka (JP); Teruto Hirota, Osaka (JP)

(73) Assignee: Panasonic Corporation, Osaka (JP)

( * ) Notice: Subject to any disclaimer, the term of this patent is extended or adjusted under 35 U.S.C. 154(b) by 1385 days.

(21) Appl. No.: 11/629,907

(22) PCT Filed: Jun. 24, 2005

(86) PCT No.: PCT/JP2005/011602
§ 371 (c)(1),
(2), (4) Date: Nov. 21, 2007

(87) PCT Pub. No.: WO2006/001365
PCT Pub. Date: Jan. 5, 2006

(65) Prior Publication Data
US 2008/0215862 A1  Sep. 4, 2008

(30) Foreign Application Priority Data

Jun. 28, 2004 (JP) .............................. 2004-190366

(51) Int. Cl.
*G06F 9/44* (2006.01)
*G06F 9/45* (2006.01)
*G06F 21/00* (2006.01)
*G06F 11/00* (2006.01)

(52) U.S. Cl. ........ 717/159; 717/106; 717/149; 717/150; 726/22; 705/57

(58) Field of Classification Search .................. 717/106, 717/150, 159
See application file for complete search history.

(56) References Cited

U.S. PATENT DOCUMENTS 6,668,325 B1 * 12/2003 Collberg et al. .............. 713/194
6,970,561 B1  11/2005 Obana
(Continued)

FOREIGN PATENT DOCUMENTS

JP  02-045829  2/1990
(Continued)

OTHER PUBLICATIONS

Kamoshida et al., "On Constructing Tamper Resistant Software," Technical Report of IEICE, 1977, pp. 69-78.*
MacDonald, Josh, "On Program Security and Obfuscation," Dec. 10, 1998, 37pg.*
Monden et al., "Obfuscated Instructions for Software Protection," NAIST, Nov. 2003, 14pg.*
(Continued)

*Primary Examiner* — Li B Zhen
*Assistant Examiner* — Ryan Coyer
(74) *Attorney, Agent, or Firm* — Wenderoth Lind & Ponack, L.L.P.

(57) ABSTRACT

A program generation apparatus generates an obfuscated program difficult to analyze from outside and a program execution apparatus executes the program. The program generation apparatus includes an acquisition unit that acquires a $1^{st}$ program including one or more instructions, the $1^{st}$ program causing a process by executing the instructions in a predetermined order to obtain a result; a generation unit that generates a $2^{nd}$ program based on the $1^{st}$ program; and an output unit that outputs the $2^{nd}$ program. The $2^{nd}$ program causes a process that is different from the process caused by the $1^{st}$ program and varies according to current information determined at execution of the $2^{nd}$ program in order to obtain a result identical to the result of the $1^{st}$ program.

19 Claims, 30 Drawing Sheets

U.S. PATENT DOCUMENTS

| | | | |
|---|---|---|---|
| 7,080,257 B1 * | 7/2006 | Jakubowski et al. | 713/187 |
| 7,340,734 B1 * | 3/2008 | de Waal | 717/159 |
| 2003/0221121 A1 * | 11/2003 | Chow et al. | 713/200 |
| 2004/0003278 A1 * | 1/2004 | Chen et al. | 713/200 |
| 2004/0039900 A1 | 2/2004 | Heishi et al. | |
| 2004/0153661 A1 * | 8/2004 | Graunke | 713/200 |
| 2005/0069131 A1 * | 3/2005 | de Jong | 380/239 |

FOREIGN PATENT DOCUMENTS

| | | |
|---|---|---|
| JP | 2000-305453 | 11/2000 |
| JP | 2002-514333 | 5/2002 |
| JP | 2003-330729 | 11/2003 |
| JP | 2004-21553 | 1/2004 |

OTHER PUBLICATIONS

Akiteru Kamoshida, Tsutomu Matsumoto, Shingo Inoue, "On Constructing Tamper Resistant Software", The Institute of Electronics, Information and Communication Engineers, Technical Report of IEICE, vol. 97, No. 461, Dec. 19, 1997, pp. 69-78 (with partial English translation).

Akiteru Kamoshida, Tsutomu Matsumoto, Shingo Inoue, "On Constructing Tamper Resistant Software", The Institute of Electronics, Information and Communication Engineers, Technical Report of IEICE, vol. 97, No. 461, Dec. 19, 1997, pp. 69-78 (with English Abstract).

Office Action issued Mar. 22, 2011 in corresponding Japanese Patent Application No. 2006-528614.

* cited by examiner

```
                                        ‚110
main( )
{
    ⓐ = 1;
    △b△ = ⓐ+2;  ————————— 1001 FLOW DEPENDENCE ON (PROCESS 1)
    ▢c▢ = ⓐ*4;  ————————— 1002 FLOW DEPENDENCE ON (PROCESS 1)
    d = △b△+▢c▢; ————————— 1003 FLOW DEPENDENCE ON (PROCESS 2)
                                       AND (PROCESS 3)

printf("%d¥n", d);
}
```

FIG. 8

| FUNCTION NAME | FUNCTION ID |
|---|---|
| funcA | 0 |
| funcB | 1 |
| funcC | 5 |
| funcC1 | 2 |
| funcD | 4 |
| funcDummy | 3 |

```
main()
{
  val->n=0;            /* 142 */
  val->s = rand();  // SET INITIAL VALUE USING RANDOM NUMBER   /* 143 */
  while( !FuncSelector( &val) );   /* 144 */
  printf("%d¥n", a->d);   /* 145 */
}
```
(140, 141)

```
struct val_t{
   int n;
   int s;
   int a;
   int b;
   int c;
   int d;
}val;

funcA(struct val_t*a)      {a->a=1;}
funcB(struct val_t*a)      {a->b=a->a+2;}
funcC1(struct val_t*a)     {a->c=a<<2;}
funcC(struct val_t*a)      {a->c=a*4;}
funcD(struct val_t*a)      {a->d=a->b+a->c;}
funcDummy(struct val_t*a)  {a->d=3;}
```

FIG. 10

```
FuncSelector(struct val_t*a )
{
    int x;
    static int f_a=f_b=f_c=0;        /── 151

// OBTAIN NEXT FUNCTION ID
    x = ( a->n*13+a->s ) % 8;        /── 152
    a->n=x;
                                                                /── 153
    // EXECUTE IN CASE WHERE SPECIFIED FUNCTION HAS YET TO BE PROCESSED
    switch( x )
    {
        case 0: if( f_a==0) {f_a=1; funcA( a ); return( 0 ); }
        case 1: if( f_b==0) {f_b=1; funcB( a ); return( 0 ); }
        case 2: if( f_c==0) {f_c=1; funcC1( a ); return( 0 ); }
        case 3: funcDummy( a ); return( 0 );
        case 4: if( (f_b==1 && f_c==1 ) {funcD( a ); return( 1 ); }
        case 5: if( f_c==0) {f_c=1; funcC( a ); return( 0 ); }
        default: return( 0 );
    }
}
```

| FUNCTION NAME | FUNCTION ID | POSITION IN MEMORY |
|---|---|---|
| funcA | 0 | 0x07e9500 |
| funcB | 1 | 0x07e9800 |
| funcC | 5 | 0x07e9900 |
| funcC1 | 2 | 0x07ea010 |
| funcD | 4 | 0x07eb010 |
| funcDummy | 3 | 0x07eb050 |

| b | $X_0$ | $X_1$ | $X_2$ | $X_3$ | $X_4$ | $X_5$ | $X_6$ | $X_7$ | $X_8$ | $X_9$ | $X_{10}$ | $X_{11}$ | $X_{12}$ |
|---|---|---|---|---|---|---|---|---|---|---|---|---|---|
| 1 | 0 | 1 | 6 | 7 | 4 | 5 | 2 | 3 | 0 | 1 | 6 | 7 | 4 |
| 3 | 0 | 3 | 2 | 5 | 4 | 7 | 6 | 1 | 0 | 3 | 2 | 5 | 4 |
| 5 | 0 | 5 | 6 | 3 | 4 | 2 | 1 | 7 | 0 | 5 | 6 | 3 | 4 |
| 7 | 0 | 7 | 2 | 1 | 4 | 3 | 6 | 5 | 0 | 7 | 2 | 1 | 4 |

231, 232, 233, 234 (bracket over columns $X_{12}$)

$X_{n+1} = (X_n * a + b) \bmod m$ ・・・ (EQUATION 1), $X_0 = 0$ ・・・ (EQUATION 2)

| | b | $x_0$ | $x_1$ | $x_2$ | $x_3$ | $x_4$ | $x_5$ | $x_6$ | $x_7$ | $x_8$ | $x_9$ | $x_{10}$ | $x_{11}$ | $x_{12}$ |
|---|---|---|---|---|---|---|---|---|---|---|---|---|---|---|
| 241 | 1 | 0 func A | 1 func B | 6 — | 7 — | ~~4 func D~~ | 5 func C | ~~2 func C1~~ | 3 func Dummy | ~~0 func A~~ | ~~1 func B~~ | 6 — | 7 — | 4 func D |
| 242 | 3 | 0 func A | 3 func Dummy | 2 func C1 | ~~5 func C~~ | ~~4 func D~~ | 7 — | 6 — | 1 func B | ~~0 func A~~ | 3 func Dummy | ~~2 func C1~~ | ~~5 func C~~ | 4 func D |
| 243 | 5 | 0 func A | 5 func C | 6 — | 3 func Dummy | ~~4 func D~~ | ~~2 func C1~~ | 1 func B | 7 — | ~~0 func A~~ | 5 func C | 6 — | 3 func Dummy | 4 func D |
| 244 | 7 | 0 func A | 7 — | 2 func C1 | 1 func B | 4 func D | ~~3 func Dummy~~ | 6 — | ~~5 func C~~ | ~~0 func A~~ | 7 — | ~~2 func C1~~ | ~~1 func B~~ | ~~4 func D~~ |

FIG. 20

300 EXECUTION PATH PATTERN LIST

| index | EXECUTION PATH PATTERN VALUE | FLAG |
|---|---|---|
| 0 | 1 | 0 |
| 1 | 3 | 0 |
| 2 | 5 | 0 |
| 3 | 7 | 0 |

```
main()
{
    val->n=0;
    val->s = rand(); // SET INITIAL VALUE
    while( !FuncSelector( &val ) );
    printf("%d¥n", a->d);
} struct val_t{
    int n;
    int s;
    int a;
    int b;
    int c;
    int d;
};
```

```
FuncSelector(struct val_t*a )
{
    int x;
    static int f_a=f_b=f_c=0;

// OBTAIN NEXT FUNCTION ID
    x = ( a->n*13+a->s ) % 8;
    a->n=x;

// EXECUTE IN CASE WHERE SPECIFIED FUNCTION HAS NOT YET BEEN PROCESSED
    switch( x )
    {
        case 0:  if( f_a==0)           {goto Label_A;}
        case 1:  if( f_b==0)           {goto Label_B;}
        case 2:  if( f_c==0)           {goto Label_C;}
        case 3:  goto Label_Dummy;
        case 4:  if( (f_b==1 && f_c==1) {goto Label_D;}
        case 5:  if( (f_c==0)           {goto Label_C;}
        default: return( 0 ) ;
    }
Label_A:
    f_a=1;a->a=1;return 0;
Label_B:
    f_b=1;a->b=a->a+2;return 0;
Label_C1:
    f_c=1;a->c=a<<2;return 0;
Label_C:
    f_c=1;a->c=a*4;return 0;
Label_D:
    f_d=1;a->d=a->b+a->c;return 1;
Label_Dummy:
    a->d=3;return 0;
}
```

| n | $a_n^1$ | $a_n^2$ | $a_n^3$ |
|---|---|---|---|
| 0 | 1 | 0 | 1 |
| 1 | 1 | 1 | 1 |
| 2 | 2 | 2 | 1 |
| 3 | 4 | 3 | 1 |
| 4 | 7 | 4 | 1 |
| 5 | 3 | 5 | 1 |
| 6 | 0 | 6 | 1 |
| 7 | 6 | 7 | 1 |
| 8 | 5 | 0 | 1 |
| 9 | 5 | 1 | 1 |
| 10 | 6 | 2 | 1 |
| 11 | 0 | 3 | 1 |
| 12 | 3 | 4 | 1 |
| 13 | 7 | 5 | 1 |
| 14 | 4 | 6 | 1 |
| 15 | 2 | 7 | 1 |
| 16 | 1 | 0 | 1 |
| 17 | 1 | 1 | 1 |
| 18 | 2 | 2 | 1 |
| 19 | 4 | 3 | 1 |
| 20 | 7 | 4 | 1 |

| S | $X_0$ | $X_1$ | $X_2$ | $X_3$ | $X_4$ | $X_5$ | $X_6$ | $X_7$ | $X_8$ | $X_9$ | $X_{10}$ | $X_{11}$ | $X_{12}$ | $X_{13}$ | $X_{14}$ | $X_{15}$ | $X_{16}$ | $X_{17}$ | $X_{18}$ | $X_{19}$ | $X_{20}$ |
|---|---|---|---|---|---|---|---|---|---|---|---|---|---|---|---|---|---|---|---|---|---|
| 1,0,1 | 1 func B | 1 func B | 2 func C1 | 4 func D | 7 — | 3 func Dummy | 0 func A | 6 — | 5 func C | 5 func C | 6 — | 0 func A | 3 func Dummy | 7 — | 4 func B | 2 func C1 | 1 func B | 1 func B | 2 func C1 | 4 func D | 7 — |

600

PROGRAM CREATION DEVICE, PROGRAM TEST DEVICE, PROGRAM EXECUTION DEVICE, INFORMATION PROCESSING SYSTEM

BACKGROUND OF THE INVENTION

1. Technical Field

The present invention relates to protection of computer programs, in particular to technology for generating, testing and executing computer programs difficult to analyze from outside.

2. Background Art

In order to prevent unauthorized use of a computer program, Patent Reference 1 discloses technology for monitoring the order of addresses accessed when the program is executed and prohibiting the execution of the program in the case when the addresses are not accessed in the correct order known only by authorized users. Herewith, unauthorized accesses to the computer program can be detected and prevented.

<Patent Reference 1> Japanese Laid-Open Patent Application No. H2-45829

<Non-Patent Reference 1> "Hajimete no Heiretsu Programming (Introductory Parallel Programming)" edited by Taiichi Yuasa, Michiaki Yasumura, and Toshiyuki Nakata and published by Kyoritsu Shuppan, 1999.

SUMMARY OF THE INVENTION

However, since the program in the above technology is executed each time in the same order, an unauthorized user may set a breakpoint in the program and analyze the program to use the program without authorization.

The present invention has been made in view of the problem above, and aims at offering a program generation apparatus for generating a computer program difficult to analyze from outside and a program execution apparatus for executing the generated program.

In order to achieve the above objects, the present invention is a program generation apparatus comprising: an acquisition unit; a generation unit; and an output unit. The acquisition unit is operable to acquire a $1^{st}$ program including one or more instructions, and the $1^{st}$ program causes a process by executing the instructions in a predetermined order to obtain a result. The generation unit is operable to generate a $2^{nd}$ program based on the $1^{st}$ program. The output unit is operable to output the $2^{nd}$ program. Here, the $2^{nd}$ program causes a process that is different from the process caused by the $1^{st}$ program and varies according to current information determined at the execution of the $2^{nd}$ program in order to obtain a result identical to the result of the $1^{st}$ program.

Furthermore, the present invention is a program execution apparatus that executes the $2^{nd}$ program generated by the above program generation apparatus, comprising: an acquisition unit operable to acquire the $2^{nd}$ program; an information specifying unit operable to specify the current information at execution of the $2^{nd}$ program; and an execution unit operable to execute the $2^{nd}$ program.

The program generation apparatus of the present invention generates the $2^{nd}$ program whose process to be executed is changed at the execution. Accordingly, every time the $2^{nd}$ program is executed, a process producing the same result but taking different execution order and execution path can be performed. Because the execution order and execution path are different in each execution, it makes difficult for an unauthorized user to analyze the program, and therefore it is possible to prevent unauthorized use of the program.

In addition, since not depending on the compiler and/or the OS, the present invention does not give leads to unauthorized analyses.

Also the generation unit may include a detection subunit operable to detect a plurality of parallel instructions among the instructions of the $1^{st}$ program. Here, the parallel instructions have no dependency with each other. The generation unit generates the $2^{nd}$ program that causes the process by executing instructions equivalent to the instructions of the $1^{st}$ program with instructions identical to the parallel instructions executed in an order varying according to the current information.

According to the configuration, the program generation apparatus detects parallelism of the $1^{st}$ program to thereby generate the $2^{nd}$ program executing a process whose output result is identical to that of the $1^{st}$ program but its execution order is different from that of the $1^{st}$ program.

Also the generation unit may include an identity instruction generation subunit operable to generate one or more identity instructions, each of which includes one or more instructions that (i) are different from one or more original instructions among the instructions of the $1^{st}$ program and (ii) output a result identical to a result output from the original instructions. Here, the generation unit generates the $2^{nd}$ program that causes the process by executing instructions equivalent to the instructions of the $1^{st}$ program with either one of instructions identical to the original instructions or the identity instructions executed, the one of the instructions identical to the original instructions and the identity instructions being selected according to the current information.

According to the configuration, the program generation apparatus is able to generate the $2^{nd}$ program causing a process to produce the same output result but take a different execution path by generating an identity instruction of an instruction included in the $1^{st}$ program.

Also the generation unit may include a dummy instruction generation subunit operable to generate a dummy instruction that is an instruction having no influence on the result of the $2^{nd}$ program. Here, the generation unit generates the $2^{nd}$ program that causes the process by executing instructions equivalent to the instructions of the $1^{st}$ program in addition to the dummy instruction executed at a timing that varies according to the current information.

According to the configuration, the program generation apparatus is able to generate the $2^{nd}$ program causing a process to produce the same output result but take a different execution path by generating a dummy instruction that has no influence the output result.

Also the generation unit may include: a detection subunit operable to detect a plurality of parallel instructions among the instructions of the $1^{st}$ program, the parallel instructions having no dependency with each other; an identity instruction generation subunit operable to generate one or more identity instructions, each of which includes one or more instructions that (i) are different from one or more original instructions among the instructions of the $1^{st}$ program and (ii) output a result identical to a result output from the original instructions; and a dummy instruction generation subunit operable to generate a dummy instruction that is an instruction having no influence on the result of the $2^{nd}$ program. Here, the generation unit generates the $2^{nd}$ program that causes the process by executing instructions equivalent to the instructions of the $1^{st}$ program (i) with instructions identical to the parallel instructions executed in an order varying according to the current information, and (ii) with either one of instructions identical to the original instructions or the identity instructions executed, the one of the original instructions and the identity instructions being selected according to the current information, (iii) in addition to the dummy instruction executed at a timing that varies according to the current information.

According to the configuration, the program generation apparatus is able to generate the $2^{nd}$ program causing a process to produce the same output result but take a different execution path by detecting parallelism and generating an identity instruction and a dummy instruction.

Also the generation unit may further include an identifier assigning subunit operable to assign identifiers to the instructions of the $1^{st}$ program, the identity instructions generated by the identity instruction generation subunit, the dummy instruction generated by the dummy instruction generation subunit, each of the identifiers uniquely identifying an instruction. Here, the generation unit generates the $2^{nd}$ program that calls instructions identified by identifiers, each of which matches a different element of a random number sequence generated according to the current information.

According to the configuration, the program generation apparatus assigns an identifier to each instruction to generate a random number sequence at the execution, and is thereby able to call instructions to be executed.

Also the generation unit may generate the $2^{nd}$ program that includes a random number sequence generation algorithm used for generating the random number sequence according to the current information.

According to the configuration, the program generation apparatus is able to assure the safety of a random number generated at the execution by generating the $2^{nd}$ program including a random number sequence generation algorithm.

Also the generation unit may generate the $2^{nd}$ program that includes a plurality of random number sequence generation algorithms used for generating a random number sequence according to the current information, select one of the random number sequence generation algorithms at the execution of the $2^{nd}$ program, and call instructions identified by identifiers, each of which matches a different element of a random number sequence generated according to the selected random number sequence generation algorithm.

According to the configuration, the program generation apparatus generates the $2^{nd}$ program in a manner that one algorithm is selected at the execution among from a plurality of random number sequence generation algorithms. Herewith, the process caused by the $2^{nd}$ program becomes more highly random.

Also the generation unit may further includes: a function data generation subunit operable to convert, into a function, each of the instructions of the $1^{st}$ program, the identity instructions generated by the identity instruction generation subunit, and the dummy instruction generated by the dummy instruction generation subunit in order to generate function data including therein a plurality of functions; an identifier assigning subunit operable to assign identifiers to the functions of the function data generated by the function data generation subunit, each of the identifiers uniquely identifying one of the functions; and a call program generation subunit operable to generate a call program that includes a random number sequence generation algorithm used for generating a random number sequence according to the current information, and instructs to call and execute, among functions identified by identifiers, each of which matches a different element of the generated random number sequence, functions conforming to a condition for obtaining the result identical to the result of the $1^{st}$ program, and generates the $2^{nd}$ program that includes the function data and the call program.

According to the configuration, the program generation apparatus converts each instruction into a function and assigns an identifier to each function. Then, by generating a random number at the execution, the program generation apparatus is able to generate the $2^{nd}$ program that calls functions to be executed.

the plurality of functions each belong to at least one of a parallel group, a sequential group, an identity group, and a dummy group, and Also the call program generation subunit may detect, for each of the plurality of functions, a group to which the each of the plurality of functions belongs, and generate the call program instructing to call the plurality of functions in an order according to the condition based on a result of the detection.

According to the configuration, the program generation apparatus determines the function attribute at the execution by introducing a concept of the function attribute to determine the execution order and parallel relationship of each function, and is thereby able to generate the $2^{nd}$ program that calls functions to be executed.

Also the program generation apparatus may further comprise: a candidate information generation unit operable to generate a plurality of pieces of candidate information, each of which is a candidate for the current information. Here, the output unit outputs a plurality of appropriate candidate information pieces together with the $2^{nd}$ program.

According to the configuration, the program generation apparatus generates in advance a plurality of candidate information pieces that are candidates for the current information and limits the current information to be decided at the execution. Thereby, the program generation apparatus is practically able to test whether multiple processes to be possibly executed will operate appropriately while ensuring the random nature of the process to be executed.

Also the program generation apparatus may further comprise: a testing unit operable to judge, with respect to each of the generated candidate information pieces, whether an action according to the candidate information piece is appropriate. Here, the output unit extracts and outputs only candidate information pieces that are determined by the testing unit to lead to an appropriate action.

According to the configuration, the program generation apparatus is able to cause only processes operating appropriately to be executed at the execution since outputting only candidate information pieces corresponding to processes that are ensured to operate appropriately.

Also the testing unit may include: a $1^{st}$ acquisition subunit operable to acquire a $1^{st}$ value obtained by executing the $1^{st}$ program; a $2^{nd}$ acquisition subunit operable to acquire a $2^{nd}$ value obtained by performing an action according to a candidate information piece; and a comparative judgment subunit operable to compare the it value and the $2^{nd}$ value, and determine, if the $1^{st}$ and $2^{nd}$ values match each other, that the action performed according to the candidate information is appropriate.

According to the configuration, the program generation apparatus is able to determine accurately whether the process executed by the $2^{nd}$ program will operate appropriately using the execution result of the $1^{st}$ program.

The present invention is also a computer program that performs a different operation in accordance with current information determined at each execution of the computer program. Here, results obtained from individual operations are constant irrelevant to the current information.

According to the configuration, the computer program is able to execute a process that produces the same result but takes a different process for each execution.

The present invention is also a program execution apparatus that executes the $2^{nd}$ program generated by the above program generation apparatus. The program execution apparatus comprises: an acquisition unit operable to acquire the $2^{nd}$ program; an information specifying unit operable to specify the current information at execution of the $2^{nd}$ program; and an execution unit operable to execute the $2^{nd}$ program.

According to the configuration, the program execution apparatus performs a different operation according to the current information specified at the execution, and is thereby able to make an unauthorized analysis difficult and prevent unauthorized use.

Also the information specifying unit may generate a random number and renders the generated random number the current information.

According to the configuration, the program execution apparatus specifies the current information by causing a random number at the execution, and is thereby able to randomly decide a process to be executed.

Also the acquisition unit may acquire a plurality of pieces of candidate information, each of which is a candidate for the current information, and the information specifying unit may select one of the candidate information pieces.

According to the configuration, the program execution apparatus only has to select one from a plurality of candidate information pieces obtained together with the $2^{nd}$ program, and therefore does not require generating the current information by, for example, producing a random number.

Also the information specifying unit may generate a random number, and select one of the candidate information pieces using the generated random number.

According to the configuration, the program execution apparatus generates a random number when selecting one from a plurality of candidate information pieces, and is therefore able to randomly select one candidate information piece using a random number.

In the above program execution apparatus that executes the $2^{nd}$ program a plurality of times, the information specifying unit may include: a storage subunit operable to store therein a candidate information piece having been selected; and a control subunit operable to perform a control to select an unselected candidate information piece by referring to the storage subunit.

According to the configuration, the program execution apparatus is able to select one candidate information piece evenly from among a plurality of candidate information pieces. Herewith, it is possible to make unauthorized analysis by the user difficult and prevent unauthorized use.

Also the program execution apparatus may further comprise: a $1^{st}$ acquisition unit operable to acquire a $1^{st}$ value obtained by executing the $1^{st}$ program; a comparative judgment unit operable to compare the $1^{st}$ value with a $2^{nd}$ value which is a result obtained by executing the $2^{nd}$ program by the execution unit, and judge whether the $1^{st}$ value and the $2^{nd}$ value match each other; and a recording unit operable to record, if the $1^{st}$ and $2^{nd}$ values are determined by the comparative judgment unit to match each other, the candidate information piece selected by the information specifying unit.

According to the configuration, the program execution apparatus is able to accurately determine, based on the execution result of the $1^{st}$ program, whether a plurality of obtained candidate information pieces operate appropriately.

In addition, the program execution apparatus makes comparative judgments about a plurality of the obtained candidate information pieces and records candidate information pieces that operated appropriately. Then, the program execution apparatus selects one of the recorded candidate information pieces at the execution of the $2^{nd}$ program and renders the selected candidate information piece the current information. Herewith, the program execution apparatus is able to execute a process having been guaranteed to operate appropriately.

Also in the above program execution apparatus, processes performed by the information specifying unit, the execution unit, the comparative judgment unit, and the recording unit may be executed a plurality of times. Here, a list including therein a plurality of candidate information pieces recorded by the recording unit is generated and then output.

According to the configuration, the program execution apparatus outputs, to another apparatus, a list including candidate information pieces which operate appropriately, and is thereby able to make the apparatus execute the $2^{nd}$ program having been guaranteed to operate appropriately.

BRIEF DESCRIPTION OF THE DRAWINGS

FIG. 8 shows a function ID table 130;

FIG. 9 shows a function call program 140 generated by the program generation unit 104;

FIG. 10 shows a function call order-determining program 150 generated by the program generation unit 104;

FIG. 12 shows a function ID table 220;

FIG. 15 illustrates generation of a random number sequence by the linear congruential method;

FIG. 16 illustrates an execution order of functions in accordance with an initial value b;

FIG. 18 shows a system configuration of an information processing system 2 according to Embodiment 2, and is a functional block diagram functionally showing internal configurations of a program generation apparatus 10a and a program execution apparatus 20a;

FIG. 20 shows a data configuration of an execution path pattern list 300;

FIG. 21 is a flowchart showing operations of an execution path pattern list generation process in the program generation apparatus 10a;

FIG. 27A shows, as a modified example, a function call program 401 generated by the program generation apparatus; and FIG. 27B shows, as a modified example, a function call order-determining program 402 generated by the program generation apparatus;

FIG. 29 illustrates values output by the cellular automaton with the aid of a specific example; and FIG. 30 illustrates an execution order of functions in accordance with values output by the cellular automaton.

Figure 1:
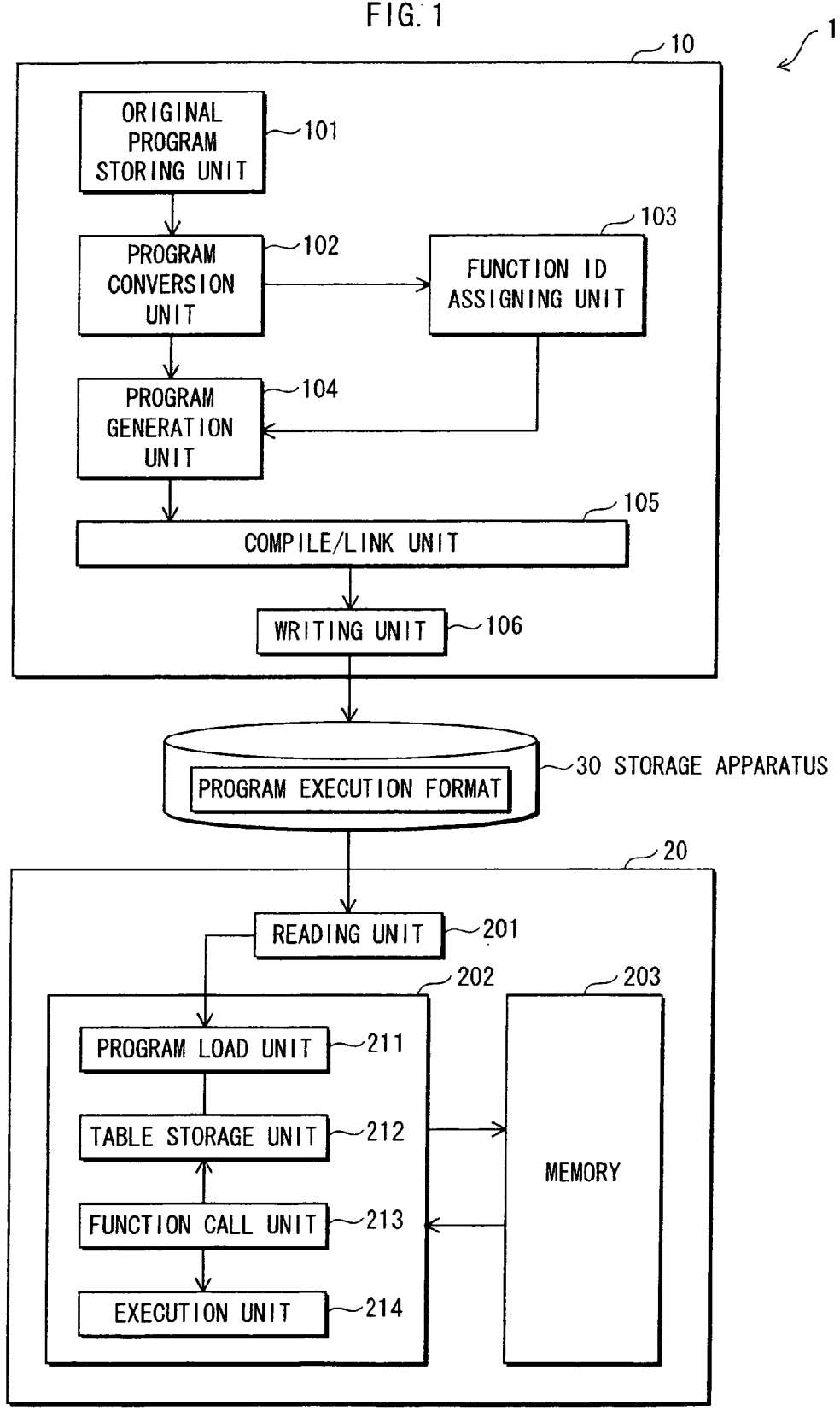
FIG. 1 is a system configuration diagram showing the configuration of an information processing system 1 according to Embodiment 1, and is a functional block diagram showing functional configurations of a program generation apparatus 10 and a program execution apparatus 20.

EXPLANATION OF REFERENCES 1 information processing system
2 information processing system
3 information processing system
10 program generation apparatus
10a program generation apparatus
10b program generation apparatus
20 program execution apparatus
20a program execution apparatus
20b program execution apparatus
30 storage apparatus
30a storage apparatus
30b storage apparatus
40a program testing apparatus
40b program testing apparatus
50b storage apparatus
101 original program storing unit
101a original program storing unit
102 program conversion unit
102a program conversion unit
103 function ID assigning unit
103a function ID assigning unit
104 program generation unit
104a program generation unit
105 compile/link unit
105a compile/link unit
106 writing unit
106a writing unit
107a execution path pattern generation unit
201 reading unit
201a reading unit
201b reading unit
202 program execution unit
202a program execution unit
202b program execution unit
203 memory
203a memory
203b memory
211 program load unit
211a program load unit
211b program load unit
212 table storage unit
212a table storage unit
212b table storage unit
213 function call unit
213a function call unit
213b function call unit
214 execution unit
214a execution unit
214b execution unit
401a reading unit
401b reading unit
402b program executing unit
403b memory
404b execution path pattern generation unit
405b writing unit
411b program load unit
412b table storage unit
413b function call unit
414b execution unit

DETAILED DESCRIPTION OF THE INVENTION

The following describes the best mode for carrying out the present invention in detail with reference to drawings.

Embodiment 1

An information processing system 1 is explained next as Embodiment 1 of the present invention with reference to drawings.

1. Overall Configuration

FIG. 1 shows a configuration of an information processing system 1. The information processing system 1 comprises: a program generation apparatus 10; a program execution apparatus 20; and a storage apparatus 30.

The program generation apparatus 10 and program execution apparatus 20 are both computer systems, and the storage apparatus 30 is, for example, an optical disk apparatus.

The program generation apparatus 10 generates a program file in executable format (hereinafter, referred to as the "program executable format") from an original program and writes the generated program executable format in the storage apparatus 30. The program execution apparatus 20 reads the program executable format stored in the storage apparatus 30 and executes this.

The storage apparatus 30 stores therein the program executable format written by the program generation apparatus 10.

2. Overall Operations

Figure 2:
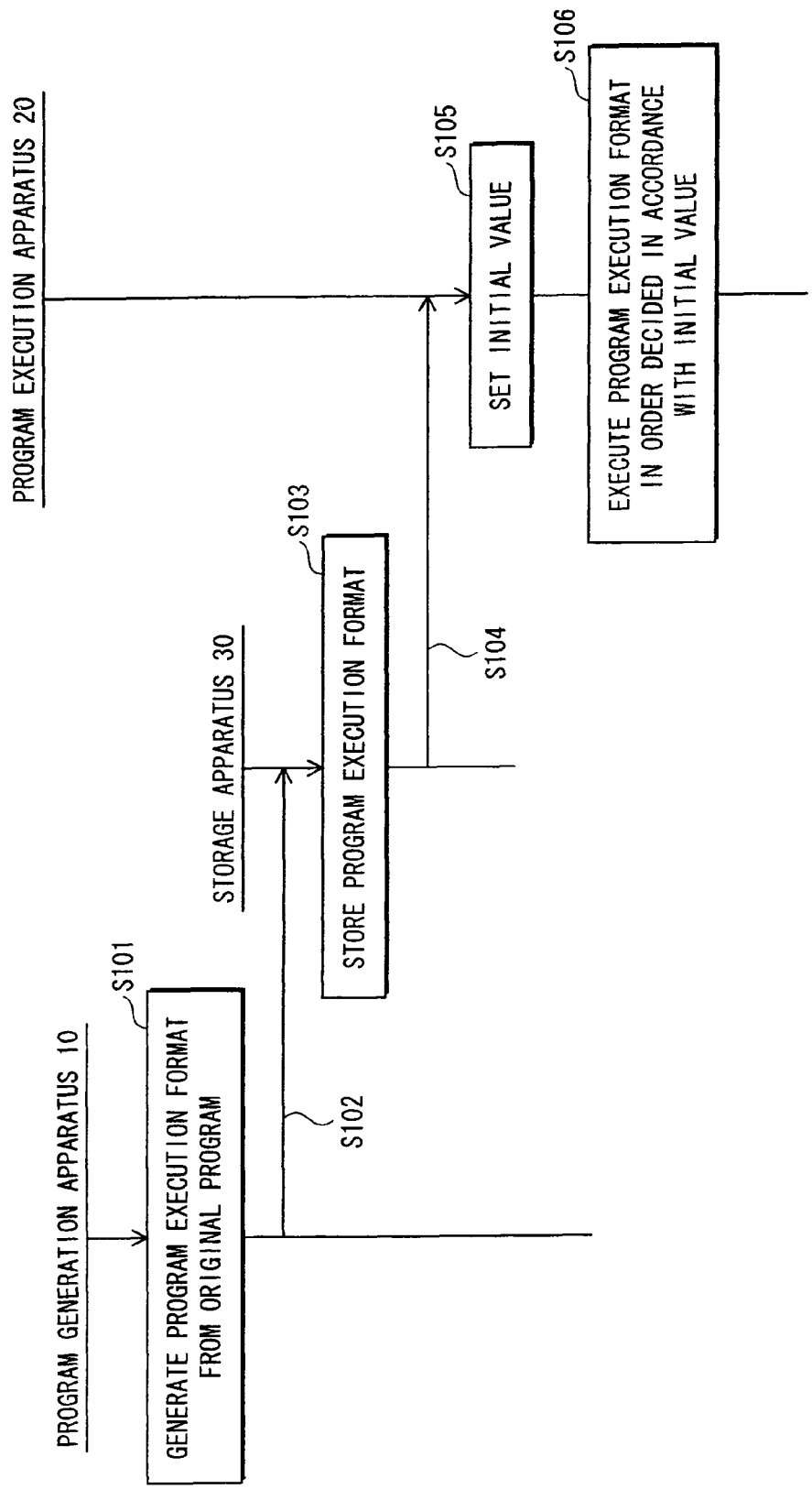
FIG. 2 is a flowchart showing the overall operations of the information processing system 1.

FIG. 2 is a flowchart showing overall operations of the information processing system 1.

First, the program generation apparatus 10 generates a program executable format from an original program (Step S101), and writes the generated program executable format in the storage apparatus 30 (Step S102). The storage apparatus 30 stores therein the program executable format (Step S103).

The program execution apparatus 20 reads a program executable format from the storage apparatus 30 (Step S104). The program execution apparatus 20 sets an initial value (Step S105), and executes each process of the program executable format in the order determined in accordance with the set initial value (Step S106).

3. Configuration of Program Generation Apparatus 10

The configuration of the program generation apparatus 10 is described here in detail.

The program generation apparatus 10 comprises, as shown in FIG. 1: an original program storing unit 101; a program conversion unit 102; a function ID assigning unit 103; a program generation unit 104; a compile/link unit 105; and a writing unit 106.

The program generation apparatus 10 is, specifically speaking, a computer system including therein a microprocessor, ROM, RAM, hard disk units, and the like. Stored in the hard disk units and RAM are computer programs, according to which the microprocessor operates, and the program generation apparatus 10 herewith realizes the functions.

(1) Original Program Storing Unit 101

Figure 3:
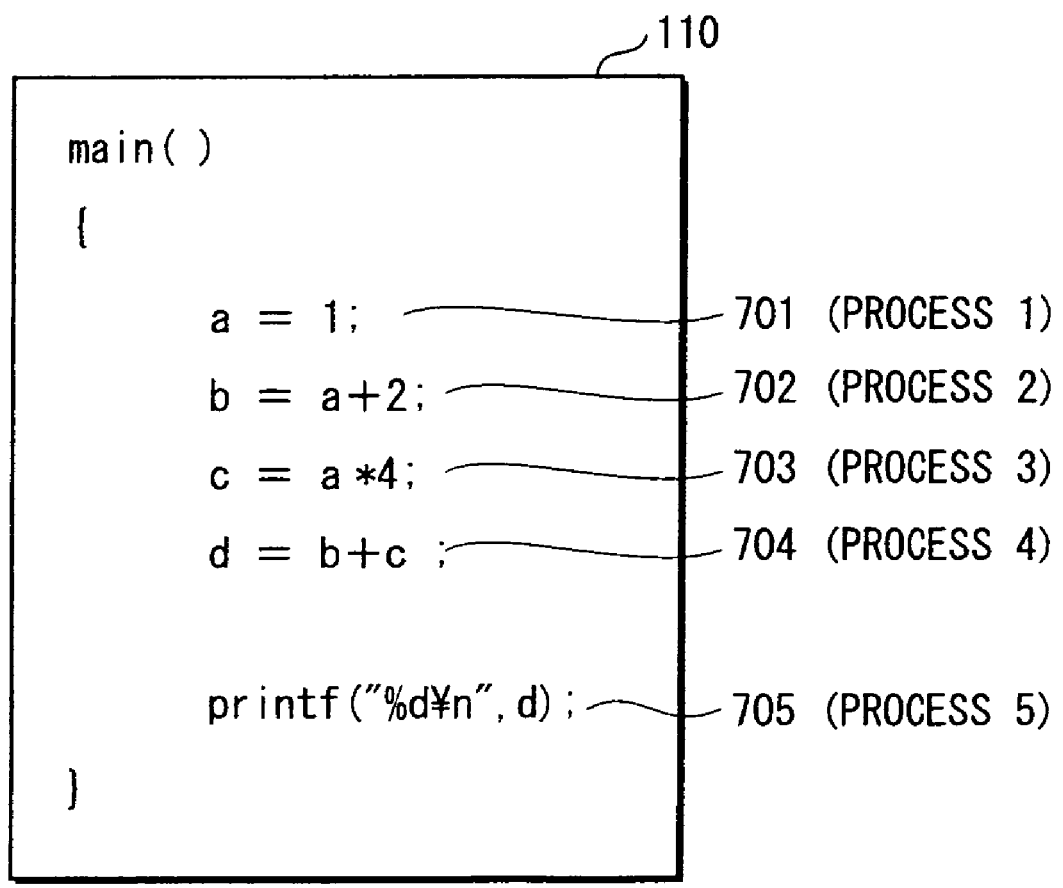
FIG. 3 shows an original program 110, which is a specific example of original programs.

The original program storing unit 101 stores therein an original program 110 shown in FIG. 3. As shown in the figure, the original program 110 is composed of five instructions—instructions 701, 702, 703, 704 and 705. The instruction 701 is referred to as (Process 1), the instruction 702 as (Process 2), the instruction 703 as (Process 3), the instruction 704 as (Process 4), and the instruction 705 as (Process 5). The original program 110 indicates to perform sequential calculation from (Process 1) to (Process 4) and to output a value, d, by (Process 5).

Note that there is no limitation to how the original program storing unit 101 obtains the original program 110. It may be entered by the user, or the original program 110 stored in a recording medium may be read thereto. Furthermore, the original program 110 of FIG. 3 is merely an example, and various programs can be considered to be those stored in the original program storing unit 101.

(2) Program Conversion Unit 102

The program conversion unit 102 performs detection of parallelism, generation of an identification transformation, generation of a dummy process, and conversion into functions.

<Detection of Parallelism>

The original program 110 is a sequential program executing the processes in the order from (Process 1) to (Process 5), as shown in FIG. 3. A sequential program includes processes related to each other in terms of a nonessential descriptive order when obtaining a calculation result. The descriptive order-related processes can produce the same calculation result as obtained in a sequential execution even if the execution order of the processes is changed. Furthermore, these processes are shared by multiple processors and executed in parallel. To detect descriptive order-related processes from a sequential program is called detection of parallelism.

The program conversion unit 102 detects parallelism from the original program 110 as follows.

In order to detect the parallelism, the program conversion unit 102 analyzes each process of the original program 110 from the beginning and examines whether there is data dependence.

Figures 4A, 4B:
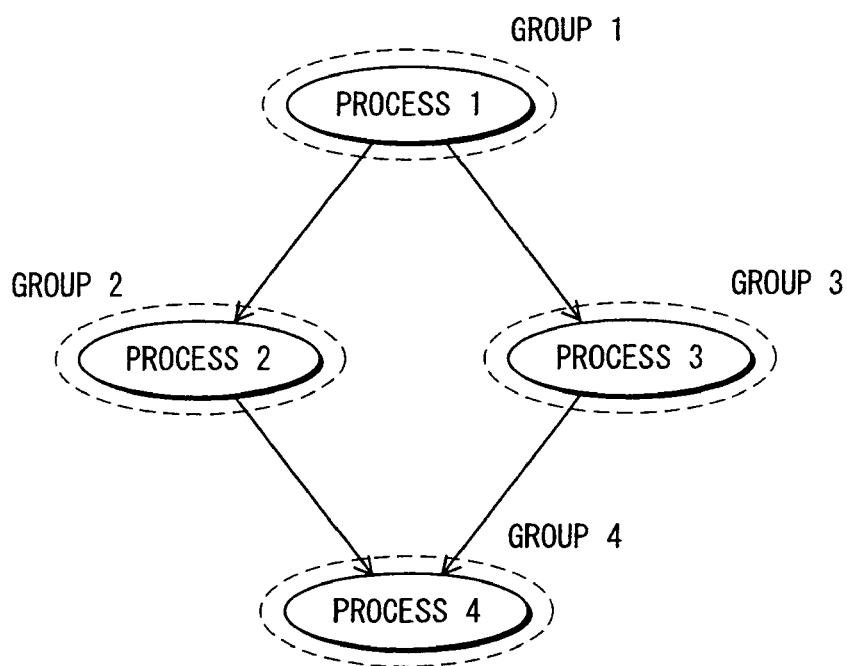
FIG. 4A illustrates dependency of each process included in the original program 110.
FIG. 4B shows a function structure of the original program 110.

As shown in FIG. 4A, the instruction 1001—namely, (Process 2)—refers to the value of a variable a substituted in (Process 1), and therefore has a flow dependence on (Process 1). The flow dependence here means a relationship in which, for example, (Process 2) can be executed only after the execution of (Process 1). As the instruction 1002, namely, (Process 3)—refers to the value of the variable a substituted in (Process 1), it has a flow dependence on (Process 1). As the instruction 1003, namely, (Process 4)—refers to the value of a variable b substituted in (Process 2) and the value of a variable c substituted in (Process 3), it has a flow dependence on (Process 2) and (Process 3).

Among processes included in the original program 110, (Process 2) and (Process 3) do not have a data dependence relationship to each other. Hence, parallelism detected in the original program 110 is one between (Process 2) and (Process 3). Note that the detection of parallelism can be realized by a parallelization compiler in the public domain.

FIG. 4B shows an essential function structure of the original program 110, not the descriptive structure. As to the original program 110, (Process 2) or (Process 3) is executed after the execution of (Process 1). Since (Process 2) and (Process 3) are in a parallel relationship to each other, their execution order does not matter, and (Process 4) is executed after both (Process 2) and (Process 3) are executed.

When detecting parallelism, the program conversion unit 102 classifies each process into a group. Here, Process 1 is categorized as Group 1, Process 2 as Group 2, Process 3 as Group 3, and Process 4 as Group 4.

<Generation of Identity Transformation>

The program conversion unit 102 generates an identity transformation in one or more groups among Groups 1 to 4. Here, the identity transformation means a different process that produces the same calculation result. Specifically speaking, the program conversion unit 102 changes an operator used or adds a constant and/or a variable to thereby generate an identity transformation.

Figure 5A:
FIG. 5A illustrates an identity transformation generated by the program conversion unit 102.

Here, as a specific example, the program conversion unit 102 generates, in Group 3, (Process 3') which is an identity transformation of (Process 3), as shown in FIG. 5A. (Process 3') is a process in which a is shifted two bits to the left, and has the same calculation result as that of a*4 of (Process 3).

Figure 5B:
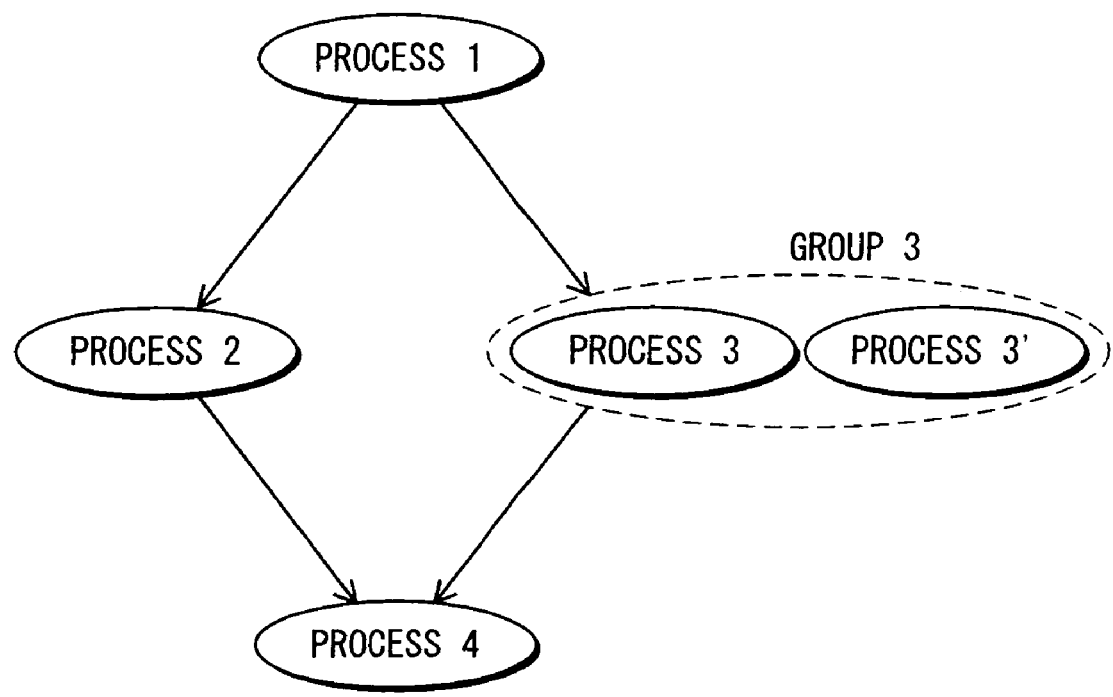
FIG. 5B shows a function structure of the original program 110 after the identity transformation is generated.

FIG. 5B shows a function structure of the original program 110 after (Process 3') is generated as described above. As shown in the figure, in the original program 110 after the generation of (Process 3'), one process among (Process 2) and processes belonging to Group 3 is executed after the execution of (Process 1). After (Process 2) and one of the processes belonging to Group 3 are executed, (Process 4) is executed. Here, only either one of (Process 3) and (Process 3') belonging to Group 3 needs to be executed. The execution order between (Process 2) and one process belonging to Group 3 does not matter.

<Generation of Dummy Process>

The program conversion unit 102 generates a dummy process in one or more groups among Groups 1 to 4. Here, the dummy process is a process that is inserted into the original program 110 in order to introduce complexity into the original program 110 and has no influence on a result output from the original program 110.

Figure 6A:
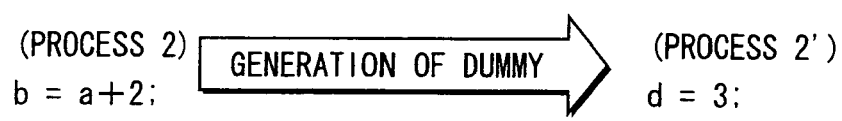
FIG. 6A illustrates a dummy process generated by the program conversion unit 102.

Here, as a specific example, the program conversion unit 102 generates, in Group 2, (Process 2') which is a dummy process of (Process 2), as shown in FIG. 6A. d=3 of (Process 2') is a process irrelevant to b=a+2 of (Process 2). Note that, since the generation of a dummy process has no influence on the overall result of the original program 110, a dummy process does not necessarily have to be generated on a group basis.

Figure 6B:
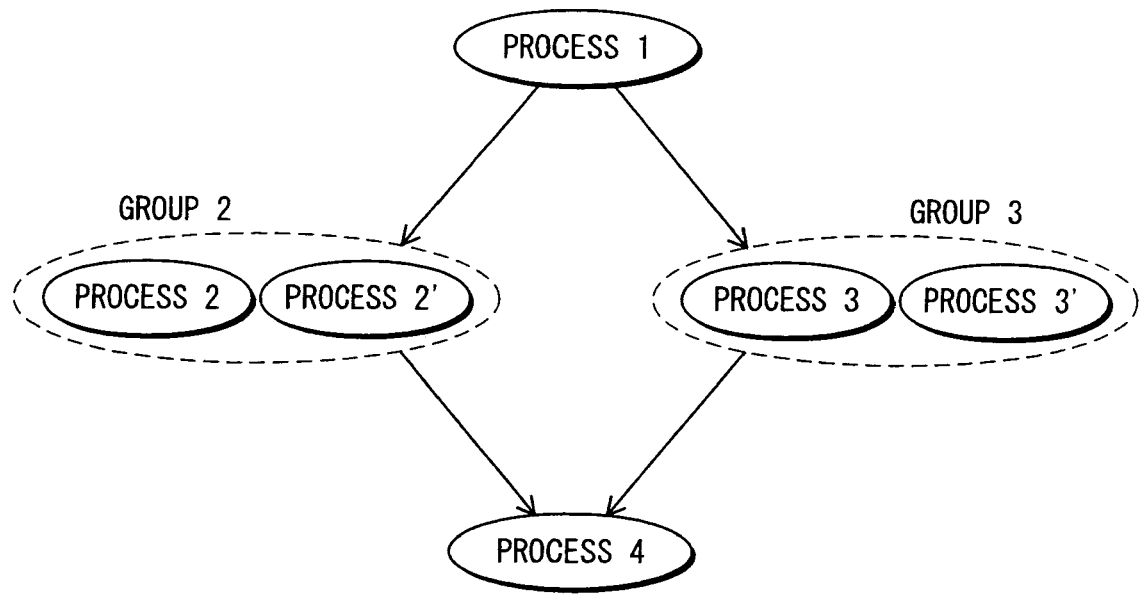
FIG. 6B shows a function structure of the original program 110 after the dummy process is generated.

FIG. 6B shows a function structure of the original program 110 after (Process 2') is generated as described above. As shown in the figure, in the original program 110 after the generation of (Process 2'), any one of the following is executed after the execution of (Process 1): one or more processes of Group 2, including (Process 2); (Process 3) of Group 3; and (Process 3') of Group 3. After (Process 2) and one of (Process 3) and (Process 3') are executed, (Process 4) is executed. Here, the dummy process (Process 2') may or may not be executed. The execution order among (Process 2), (Process 2'), and one of (Process 3) and (Process 3') does not matter.

<Conversion into Functions>

The program conversion unit 102 generates function data 120 by converting each of (Process 1), (Process 2), (Process 2'), (Process 3), (Process 3') and (Process 4) into a function.

Figure 7:
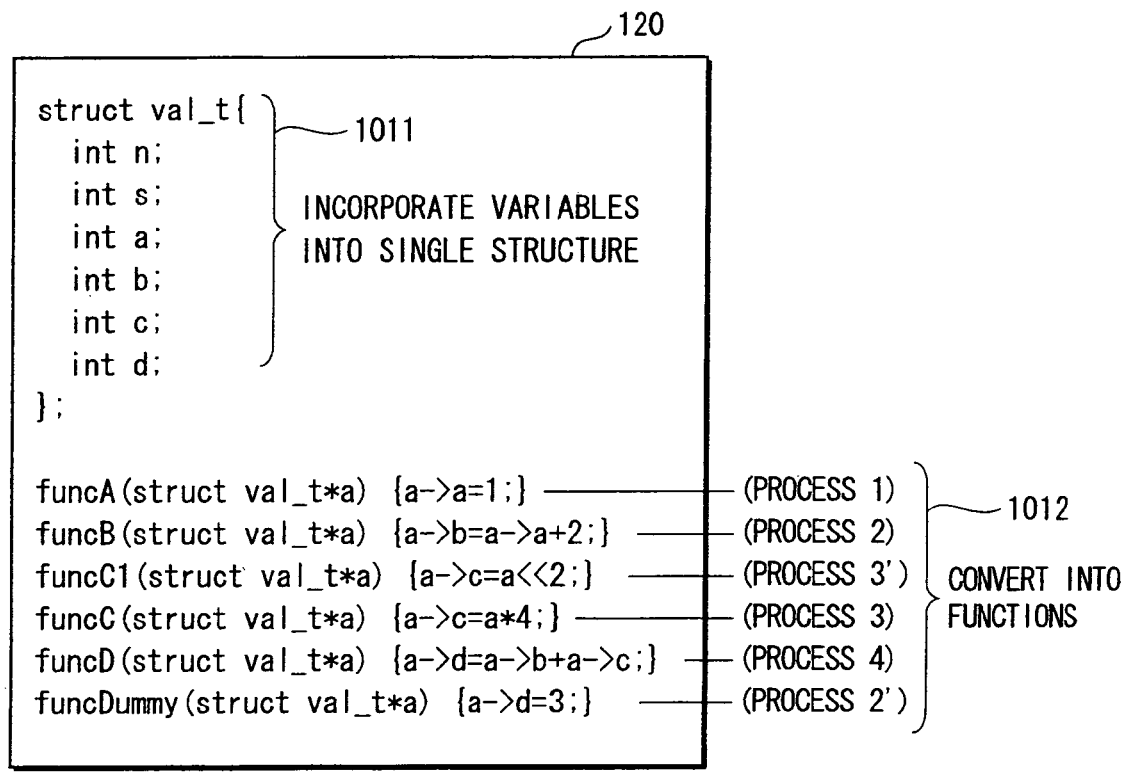
FIG. 7 shows function data 120 generated by incorporating variables of individual processes into a structure and converting each process into a function.

FIG. 7 shows the function data 120. Here, as a specific example, the program conversion unit 102 incorporates variables used into a single structure 1011 called "struct val_t" in order to integrate the types of arguments, and converts (Process 1) into "funcA", (Process 2) into "funcB", (Process 3') into "funcC1", (Process 3) into "funcC", (Process 4) into "funcD" and (Process 2') into "funcDummy" to thereby generate data 1012.

The program conversion unit 102 sends the generated function data 120 and function structure to the program generation unit 104. The function structure is data used for determining the processing order of each function and generated by converting, for example, a function structure 250 shown in FIG. 17 into data. Note that there is no limitation to a data type of the function structure held by the program generation apparatus 10.

(3) Function ID Assigning Unit 103

The function ID assigning unit 103 generates a function ID that uniquely identifies each function included in the function data 120 generated by the program conversion unit 102. The function ID assigning unit 103 associates the generated function ID with the function name of each function to generate a function ID table 130. Note that function IDs can be random values.

FIG. 8 shows the function ID table 130. According to FIG. 8, the function IDs of funcA, funcB, funcC, funcC1, funcD, and funcDummy are "0", "1", "5", "2", "4", and "3", respectively.

The function ID assigning unit 103 sends the generated function ID table 130 to the program generation unit 104.

(4) Program Generation Unit 104

The program generation unit 104 generates a function call program 140 shown in FIG. 9 and a function call order-determining program 150 shown in FIG. 10.

<Generation of Function Call Program 140>

The program generation unit 104 prestores therein function call program generation information. The function call program generation information is data in which "val->s=rand( );" 143 and "while(!FuncSelector(&val));" 144 within the function call program 140 of FIG. 9 are written. "val->s=rand( );" 143 indicates setting the value of s to a value of a random number generated at the execution. "while (!FuncSelector(&val));" 144 indicates updating val->n and performing loop iteration until FuncSelector returns "1".

Note that the function call program generation information is merely an example and not limited to this style. Next is described the generation of the function call program 140.

The program generation unit 104 determines from the function structure received from the program conversion unit 102 that the function to be executed at the beginning is funcA, and also determines from the function ID table 130 received from the function ID assigning unit 103 that the function ID for identifying funcA is "0". Then the program generation unit 104 writes "val->n=0;" 142 to the function call program generation information. Furthermore, the program generation unit 104 determines from the function structure that the function to be executed at the end is funcD, and writes "printf ("% d\n",a->d);" 145 to the function call program generation information to generate a main function 141. Here, 145 indicates outputting a value of d when the loop of the while statement is finished.

Then, the program generation unit 104 writes the function data 120 to the function call program generation information to thereby generate the function call program 140 shown in FIG. 9.

<Generation of Function Call Order-Determining Program 150>

The program generation unit 104 prestores therein function call order-determining program generation information. The function call order-determining program generation information is data in which "FuncSelector( )", "int x", "x=(a->n*13+a->s)%8;" 152, "a->n=x", and "switch(x)" of 153 within the function call order-determining program 150 of FIG. 10 are written. Note that the function call order-determining program generation information is merely an example and not limited to this style.

Here, 152 shows the following (Eq. 1).

$$X_{n+1}=(X_n*a+b) \bmod m \qquad (Eq. 41)$$

where a=13 and m=8.

(Eq. 1) is an algorithm of a pseudo-random number generation called the linear congruential method, and is a recursive equation generating a random number sequence {$X_0, X_1, X_2, X_3, \ldots$} consisting of random numbers not less than 0 but less than m. Furthermore, (Eq. 1) is a recurrence equation generating a different random number sequence by changing the constant term b. In the present description, the constant term b is referred to as the "initial value b". Next is described the generation of the function call order-determining program 150.

The program generation unit 104 writes a function name in "FuncSelector( )" to set "FuncSelector(struct val_t*a)".

The program generation unit 104 determines the execution order of each function based on the function structure, and writes to the function call order-determining program generation information, a variable "f_a" storing whether funcA has been processed, a variable "f_b" storing whether funcB has been processed, and a variable "f_c" storing whether funcC or funcC1 has been processed. Since funcC and funcC1 are identity transformations, only one of them has to be processed, and therefore the same variable "f_c" is used. Each variable takes a value "0" or "1" with "0" indicating the function has not been processed and "1" indicating the function has been processed. To cite a specific example, "static int f_a=f_b=f_c=0;", as shown in 151, is written as the initial state of the variables, indicating none of the functions has been processed.

In addition, the program generation unit 104 generates a switch statement 153 from the function ID table 130 and a function structure.

The program generation unit 104 determines from the function ID table 130 that a function having the function ID "0" is funcA, and writes case0:if(f_a==0){f_a=1;funcA(a);return(0);} in the switch statement 153.

case0 indicates a process to be executed when the value of x generated in 152 is "0". When x=0, and in the case where the variable f_a stored in 151 is "0"—i.e. in the case where funcA has not been processed, the program generation unit 104 processes funcA, then changes the variable f_a to "1", and returns "0" to the function call program 140.

Subsequently, the program generation unit 104 determines from the function ID table 130 that a function having the function ID "1" is funcB, and writes case1:if(f_b==0){f_b=1;funcB(a);return(0);} in the switch statement 153.

case1 indicates a process to be executed when the value of x generated in 152 is "1". When x=1, and in the case where the variable f_b stored in 151 is "0"—i.e. in the case where funcB has not been processed, the program generation unit 104 processes funcB, then changes the variable f_b to "1", and returns "0" to the function call program 140.

Subsequently, the program generation unit 104 determines from the function ID table 130 that a function having the function ID "2" is funcC1, and writes case2:if(f_c==0){f_c=1;funcC1(a);return(0);} in the switch statement 153.

case2 indicates a process to be executed when the value of x generated in 152 is "2". When x=2, and in the case where the variable f_c stored in 151 is "0"—i.e. in the case where funcC and funcC1 have not been processed, the program generation unit 104 processes funcC1, then changes the variable f_c to "1", and returns "0" to the function call program 140.

Subsequently, the program generation unit 104 determines from the function ID table 130 that a function having the function ID "3" is funcDummy, and writes case3:funcDummy(a);return(0); in the switch statement 153.

case3 indicates a process executed when the value of x generated in 152 is "3". When x=3, the program generation unit 104 executes funcDummy which is a dummy process, and returns "0".

Next, the program generation unit 104 determines from the function ID table 130 that a function having the function ID "4" is funcD, and writes case4:if(f_b==1 && f_c==1){funcD(a);return(1);} in the switch statement 153.

case4 indicates a process to be executed when the value of x generated in 152 is "4". When x=4, and in the case where both f_b and f_c are "1"—i.e. in the case where funcB and one of funcC and funcC1 have been processed, the program generation unit 104 processes funcD and returns "1" to the function call program 140.

Subsequently, the program generation unit 104 determines from the function ID table 130 that a function having the function ID "5" is funcC, and writes case5:if(f_c==0){f_c=1;funcC(a);return(0);} in the switch statement 153.

case5 indicates a process to be executed when the value of x generated in 152 is "5". When x=5, and in the case where the variable f_c stored in 151 is "0"—i.e. in the case where funcC and funcC1 have not been processed, the program generation unit 104 processes funcC, then changes the variable f_c to "1", and returns "0" to the function call program 140.

Once having created "case" for each of all function IDs included in the function ID table 130, the program generation unit 104 writes default:return(0) in the function call order-determining program generation information. default indicates a process to be executed when none of case0 to case5 is satisfied. That is, when the value of x generated in 152 is none of 0, 1, 2, 3, 4, and 5, the program-generation unit 104 returns "0" to the function call program 140.

The program generation unit 104 sends to the compile/link unit 105, the function ID table 130 received from the function ID assigning unit 103, the generated function call program 140, and the generated function call order-determining program 150.

(5) Compile/Link Unit 105

The compile/link unit 105 compiles and links the function ID table 130, function call program 140, and function call order-determining program 150 to generate a program executable format. The generated program executable format is written to the storage apparatus 30 via the writing unit 106.

(6) Writing Unit 106

The writing unit 106 is a driver corresponding to the storage apparatus 30, and writes to the storage apparatus 30, the program executable format generated after the compilation and linking by the compile/link unit 105.

4. Operations of Program Generation Apparatus 10

Figure 11:
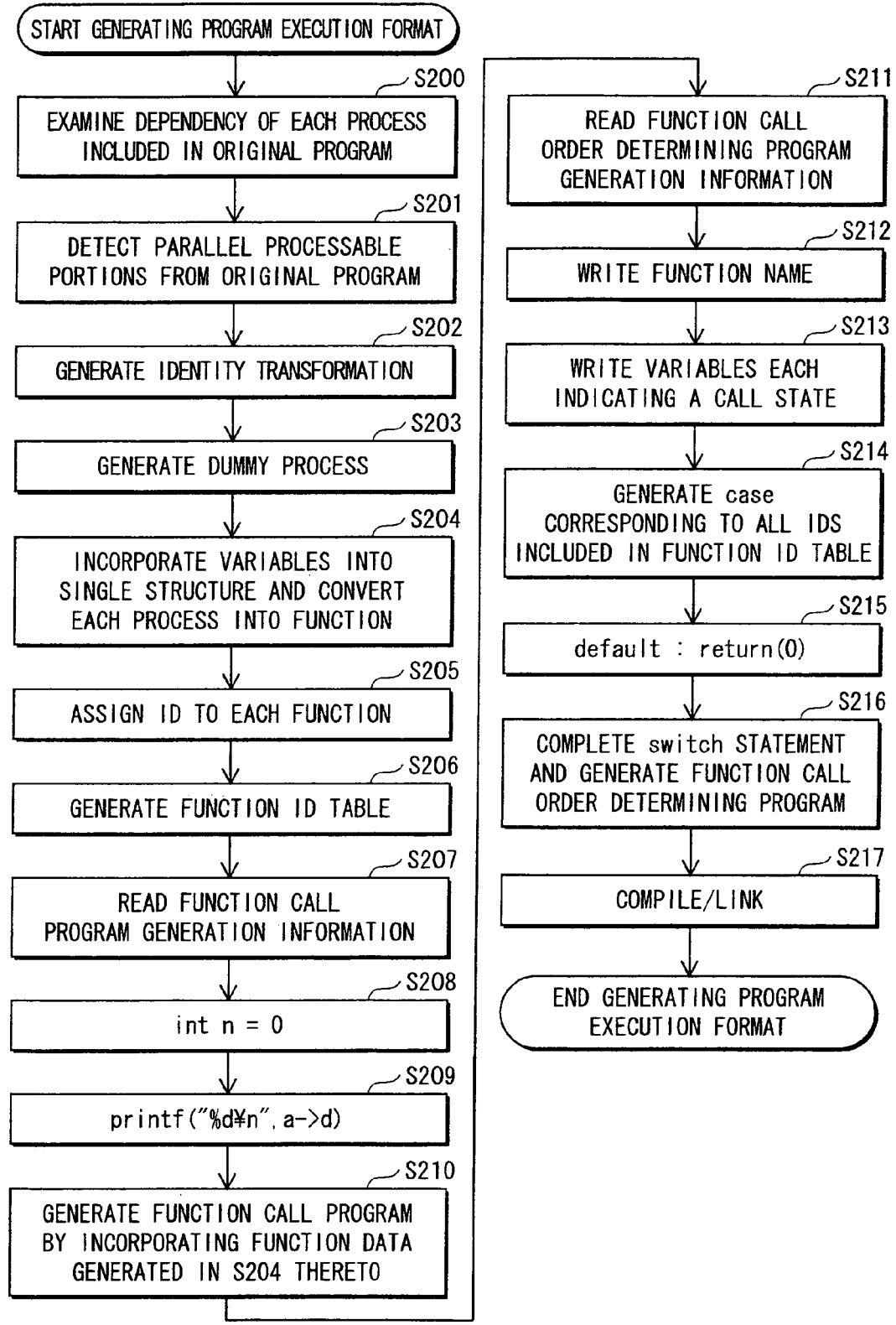
FIG. 11 is a flowchart showing operations of a process for generating a program executable format performed by the program generation apparatus 10.

Here is described the operations of the program generation apparatus 10 for generating a program executable format, with reference to a flowchart of FIG. 11. Note that the operations explained here are the detail of Step S101 of FIG. 2.

First, the program conversion unit 102 reads the original program 110 stored in the original program storing unit 101, analyzes each process included in the read original program 110, and examines dependency of each process (Step S200). The program conversion unit 102 detects parallel processable portions based on the result of the dependency examination (Step S201). The program conversion unit 102 groups each process, and generates an identity transformation in one or more groups (Step S202). As a specific example, the program conversion unit 102 generates, in Group 3, (Process 3') which is an identity transformation of (Process 3).

Next, the program conversion unit 102 generates a dummy process in one or more groups (Step S203). As a specific example, the program conversion unit 102 generates, in Group 2, (Process 2') which is a dummy process of (Process 2).

Subsequently, the program conversion unit 102 incorporates variables of (Process 1) to (Process 4) included in the original program 110 and variables of the identity transformation (Process 3') and the dummy process (Process 2') into a single structure, and converts each process into a function to thereby generate the function data 120 of FIG. 7 (Step S204).

Then, the function ID assigning unit 103 assigns to each function converted by the program conversion unit 102, a function ID which uniquely identifies the function (Step S205), and generates the function ID table 130 of FIG. 8, composed of function names and function IDs (Step S206).

The program generation unit 104 then reads the function call program generation information (Step S207), and writes "int n=0" in the read function call program generation information (Step S208). After writing "printf("% d\n",a->d)" in the function call program generation information (Step S209), the program generation unit 104 incorporates the function data 120 (FIG. 7) generated in Step S204 into the function call program generation information to thereby generate the function call program 140 of FIG. 9 (Step S210).

Next, the program generation unit 104 reads the function call order-determining program generation information (Step S211), and writes a function name in "FuncSelector( )" of the read function call order determining generation information to set "FuncSelector(struct val_t*a)" (Step S212). The program generation unit 104 subsequently writes in the function call order-determining program generation information, variables each storing a call state of a function and the variables' initial states "static int f_a=f_b=f_c=0" (Step S213).

Then, the program generation unit 104 generates "case" for each of all function IDs included in the function ID table 130 (Step S214). Specifically speaking, in the function ID table 130, function IDs from 0 to 5 and function names corresponding to the function IDs are written. The program generation unit 104 generates case 0 to case 5 shown in FIG. 10. Once generating cases corresponding to all the function IDs, the program generation unit 104 generates "default:return(0)" (Step S215).

The program generation unit 104 completes a switch statement by including cases and default generated in Steps S214 and S215, and includes the switch statement in the function call order-determining program generation information to thereby generate the function call order-determining program 150 of FIG. 10 (Step S216).

Subsequently, the compile/line unit 105 compiles and links the function ID table 130, the function call program 140, and the function call order-determining program 150 to generate a program executable format (Step S217).

5. Configuration of Program Execution Apparatus 20

Here is described the configuration of the program execution apparatus 20.

As shown in FIG. 1, the program execution apparatus 20 comprises: a reading unit 201; a program execution unit 202; and a memory 203.

The program execution apparatus 20 is, specifically speaking, a computer system including therein a microprocessor, ROM, RAM, hard disc units, and the like.

(1) Reading Unit 201

The reading unit 201 is a driver corresponding to the storage apparatus 30. The reading unit 201 reads, while the storage apparatus 30 being inserted thereto, a program executable format stored in the storage apparatus 30 in response to an instruction from the program execution unit 202, and outputs it to the program execution unit 202.

(2) Program Execution Unit 202

The program execution unit 202 is realized by a microprocessor, a memory for operations, the function call program 140, the function call order-determining program 150, and the like.

The program execution unit 202 receives the program executable format from the reading unit 201 and stores it in the memory 203. The program execution unit 202 also calls the program executable format from the memory and executes it.

The inside of the program execution unit 202 of FIG. 1 shows functional elements of the program execution unit 202. As shown in the figure, the program execution unit 202 is composed of: a program load unit 211; a table storage unit 212; a function call unit 213; and an execution unit 214. The following explains the program execution unit 202 based on these functional elements.

The program load unit 211 instructs the reading unit 201 to read the program executable format from the storage apparatus 30, and receives the program executable format from the reading unit 201. The program load unit 211 loads into the memory 203, the function call program 140 and the function call order-determining program 150 in the received program executable format.

The program load unit 211 also adds addresses, each of which indicates the position of a function included in the function call program 140 loaded into the memory 203, to the function ID table 130 received from the reading unit 201 and thereby generates a function ID table 220 shown in FIG. 12. The program load unit 211 stores the generated function ID table 220 in the table storage unit 212.

The table storage unit 212 receives the function ID table 220 from the program load unit 211 and stores it therein. The function ID table 220 associates, for each function, a function name with a function ID and its position in the memory, as shown in FIG. 12. For example, an address indicating the position in the memory 203 where the function "funcA" identified by the function ID "0" is "0x07e9500".

The function call unit 213 includes a call state storing unit, and stores the following information:

(a) information indicating whether funcA, funcB, and one of funcC and funcC1 have been executed by the execution unit 214—specifically speaking, the function call unit 213 determines whether each function has been executed, based on the variables f_a, f_b, and f_c indicated in 151 of the function call order-determining program 150 shown in FIG. 10;

(b) information indicating the parallelism of functions—specifically speaking, the function call unit 213 determines the parallelism of funcB and funcC based on 151 and 153 of the function call order-determining program 150; and (c) information indicating the function structure—specifically speaking, the function call unit 213 determines, based on $X_0=0$ in 142 of the function call program 140 and 153 of the function call order-determining program 150, that funcA is to be executed first, then funcB and one of funcC and funcC1 are to be executed, and funcD is to be executed last.

The function call unit 213 finds a function ID of a function to be executed, and obtains a corresponding address from the function ID table 220. Then, the function call unit 213 calls a function from the memory 203 based on the obtained address and sends this to the execution unit 214.

Specially speaking, since $X_0=0$, the function call unit 213 first calls funcA having the function ID "0" from the memory 203 and sends funcA to the execution unit 214.

The function call unit 213 generates a random number, assigns the generated random number to b in (Eq. 1), and then assigns $X_0=0$ to obtain $X_1$. Based on each information of the call state storing unit, the function call unit 213 judges whether to execute a function having the function ID $X_1$. When determining the function should be executed, the function call unit 213 obtains a corresponding address from the function ID table 220, and calls the function from the memory 203 and sends this to the execution unit 214. After sending the function to the execution unit 214, the function call unit 213 changes a variable held by the call state storing unit, which indicates whether the function has been executed or not, to a state showing "executed".

Subsequently, the function call unit 213 assigns $X_1$ in (Eq. 1) to obtain $X_2$. In a similar fashion, the function call unit 213 determines whether to execute a function having the function ID $X_2$, based on each information of the call state storing unit. When determining the function should be executed, the function call unit 213 obtains a corresponding address from the function ID table 220, and calls the function from the memory 203 and sends this to the execution unit 214. After sending the function to the execution unit 214, the function call unit 213 changes a variable held by the call state storing unit, which indicates whether the function has been executed or not, to a state showing "executed".

Similarly, the function call unit 213 sequentially assigns $X_n$ in (Eq. 1) to obtain $X_{n+1}$. The function call unit 213 repeats the above process until funcD is called and executed. Once funcD is executed, the function call unit 213 ends the process.

Note that, in the case where a function ID matching the obtained $X_n$ is not found in the function ID table 220, the function call unit 213 assigns $X_n$ in (Eq. 1), and discards $X_n$ after obtaining $X_{n+1}$.

The execution unit 214 executes a function received from the function call unit 213.

(3) Memory 203

The memory 203 is, specifically speaking, composed of RAM and ROM, and stores the function call program 140 written thereto by the program load unit 211 and the function call order-determining program 150.

6. Operations of Program Execution Apparatus 20

Figure 13:
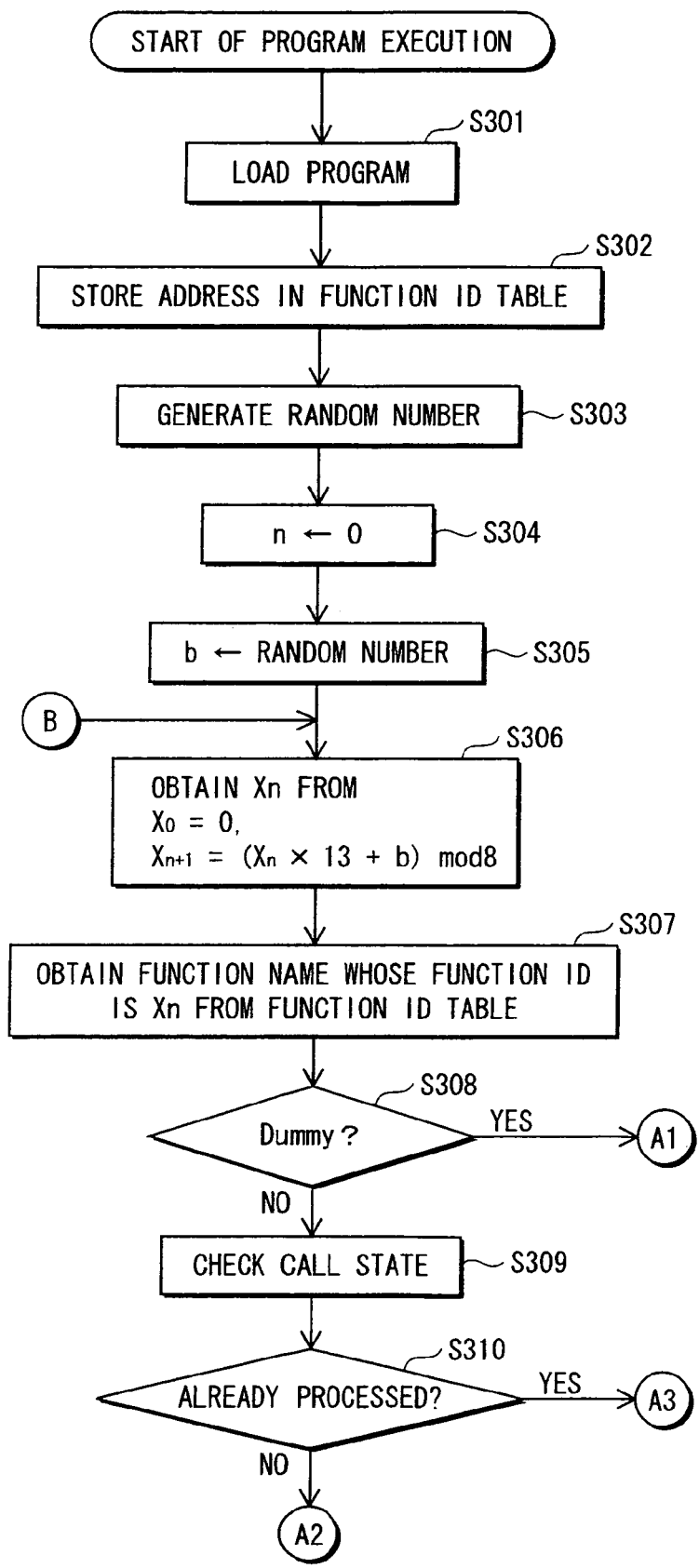
FIG. 13 is a flowchart showing operations of a program execution process performed by the program execution apparatus 20 (continuing to FIG. 14)
Figure 14:
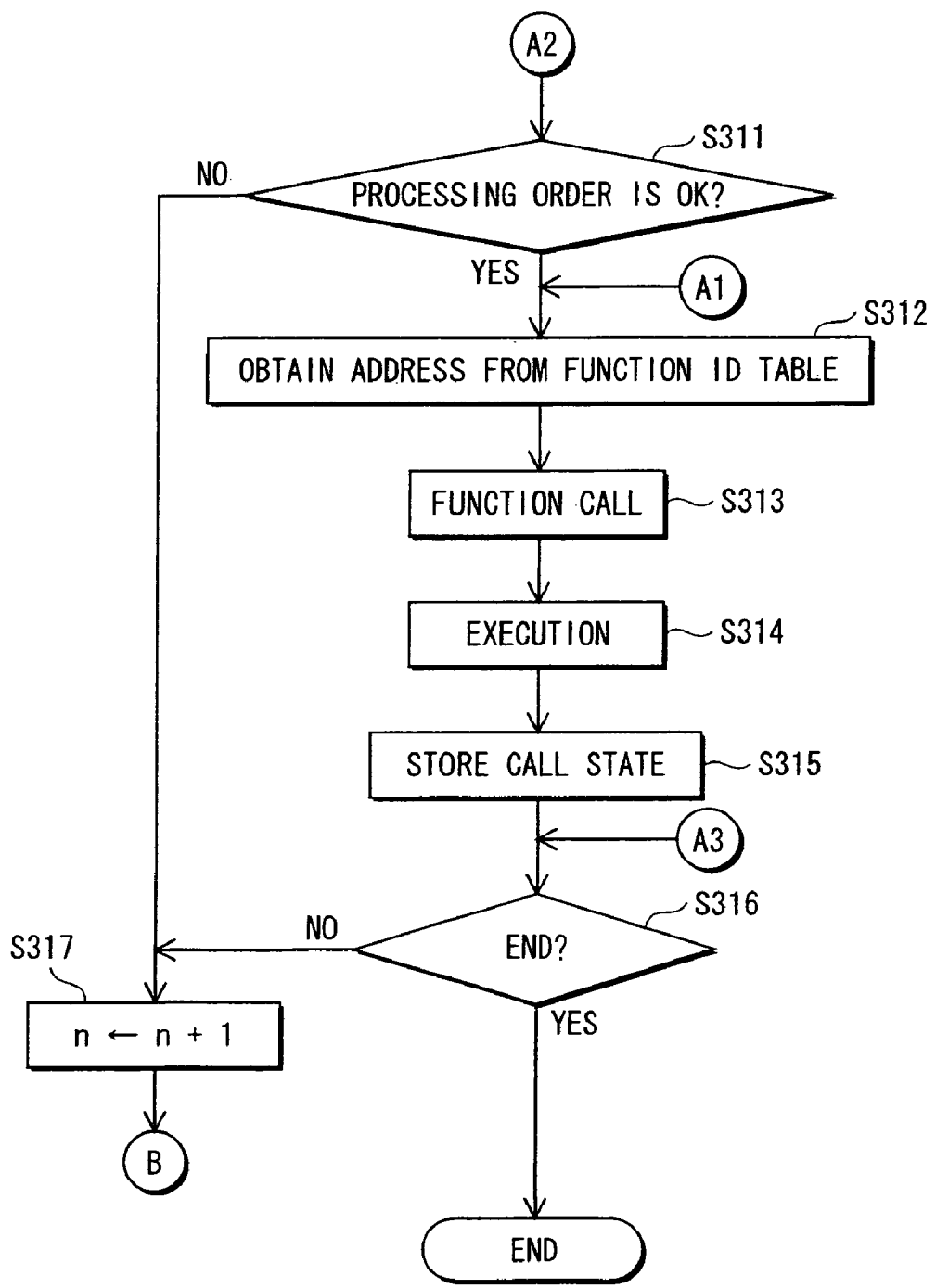
FIG. 14 is a flowchart showing operations of the program execution process performed by the program execution apparatus 20 (continued from FIG. 13)

The following describes operations of the program execution apparatus 20 with reference to flowcharts of FIGS. 13 and 14.

First, the program load unit 211 reads a program executable format from the storage apparatus 30 via the reading unit 201, and loads the function call program 140 and function call order-determining program 150 into the memory 203 (Step S301). Furthermore, the program load unit 211 receives the function ID table 130 from the reading unit 201, stores addresses each indicating the position of a function in the memory 203 (Step S302), and generates the function ID table 220. The program load unit 211 stores the generated function ID table 220 in the table storage unit 212.

The function call unit 213 generates a random number (Step S303), and sets 0 to n (Step S304). The function call unit 213 sets the random number generated in Step S303 as the initial value b (Step S305), and obtains $X_n$ from the following equations (Step S306):

$$X_{n+1}=(X_n*13+b) \bmod 8 \quad \text{(Eq. 1)}$$

$$X_0=0 \quad \text{(Eq. 2).}$$

Here, $X_0=0$ of (Eq. 2) is given by the function call program 140.

The function call unit 213 obtains, from the function ID table 220 stored in the table storage unit 212, a function name whose function ID is the same as that of $X_n$ obtained in Step S306 (Step S307). For example, the function call unit 213 obtains the function name funcA from the function ID table 220 in the case where $X_n$ obtained in Step S306 is "0", whereas obtaining the function name funcDummy from the function ID table 220 in the case of $X_n=3$.

When the function name obtained in Step S307 is funcDummy (YES in Step S308), the function call unit 213 proceeds to Step S312 and proceeds processing, whereas when the function name is not funcDummy (No in Step S308), the function call unit 213 checks the call state (Step S309). Specifically speaking, the function call unit 213 judges whether the internal call state storing unit stores therein the same function name as one obtained in Step S307.

When the call state storing unit stores the same function name, which namely means that a function having the function name obtained in Step S307 has already processed (YES in Step S310), the function call unit 213 proceeds to Step S316 and proceeds processing. When the call state storing unit does not store the same function name, which namely means that a function having the function name obtained in Step S307 has yet to be processed (NO in Step S310), the function call unit 213 checks the function structure of the call state storing unit.

For example, funcD will not be processed if funcB and one of funcC and funcC1 have not been processed.

When the processing order of the function name obtained in Step S307 is not correct (NO in Step S311), the function call unit 213 proceeds to Step S317 and proceeds processing. When the processing order is correct (YES in Step S311), the function call unit 213 obtains, from the function ID table 220 stored in the table storage unit 212, an address of the function name obtained in Step S307—i.e. an address indicating the position, in the memory 203, of a function corresponding to the same function ID as $X_n$ obtained in Step S306 (Step S312). For example, when $X_n=0$ and the function name is funcA, the function call unit 213 obtains the address "0x07e9500".

Next, the function call unit 213 calls a function from a position in the memory 203, indicated by the address obtained in Step S312 (Step S313), and sends the function to the execution unit 214. The execution unit 214 receives the function from the function call unit 213 and executes this (Step S314).

Subsequently, the function call unit 213 stores the function name of the executed function in the call state storing unit as a processed function (Step S315).

Based on the processing status of functions, the function call unit 213 judges whether to end the process. In the case where all the functions have been processed, the function call unit 213 determines to end the process (YES in Step S316) and then ends the process. If there are unprocessed functions (No in Step S316), the function call unit 213 sets n+1 to n (Step S317), returns to Step S306, and proceeds processing.

The program execution apparatus 20 sets the generated random number to the initial value b, as above, and obtains a random number sequence $\{X_0, X_1, X_2, \ldots\}$ unique to the initial value b from:

$$X_{n+1}=(X_n*13+b) \bmod 8; \text{ and}$$

$$X_0=0.$$

The following description is given with assigning a specific value to b. A table of FIG. 15 shows specific examples of random number sequences obtained from (Eq. 1) included in the function call order-determining program 150 and (Eq. 2) included in the function call program 140 when the initial value b is changed.

231 shows a part of the random number sequence generated when the initial value b=1 is assigned to (Eq. 1). As shown in the figure, the random number sequence generated in the case of b=1 is:

{0, 1, 6, 7, 4, 5, 2, 3, 0, 1, 6, 7, 4, . . . }.

232 shows a part of the random number sequence generated when the initial value b=3 is assigned to (Eq. 1). As shown in the figure, the random number sequence generated in the case of b=3 is:

{0, 3, 2, 5, 4, 7, 6, 1, 0, 3, 2, 5, 4, . . . }

233 shows a part of the random number sequence generated when the initial value b=5 is assigned to (Eq. 1). As shown in the figure, the random number sequence generated in the case of b=5 is:

{0, 5, 6, 3, 4, 2, 1, 7, 0, 5, 6, 3, 4, . . . }.

234 shows a part of the random number sequence generated when the initial value b=7 is assigned to (Eq. 1). As shown in the figure, the random number sequence generated in the case of b=7 is:

{0, 7, 2, 1, 4, 3, 6, 5, 0, 7, 2, 1, 4, . . . }.

Table 240 of FIG. 16 shows specific examples of execution orders of functions in the case where the initial value b is changed.

241 shows an execution order of functions when the initial value b=1 is assigned to (Eq. 1). When b=1, the function call unit 213 first obtains $X_0=0$. The function call unit 213 obtains, from the function ID table 220, the address "0x07e9500" of funcA whose function ID is 0, calls, from the memory 203, funcA in the position indicated by the obtained address, and sends this to the execution unit 214. The execution unit 214 executes funcA.

Next, the function call unit 213 obtains $X_1=1$. The function call unit 213 determines, from the function ID table 220, a function whose function ID is 1 is funcB, and determines, from information stored in the call state storing unit, that funcB has yet to be executed. In addition, the function call unit 213 also determines from the information stored in the call state storing unit that the execution order is correct. The function call unit 213 obtains the address "0x07e9800" of funcB from the function ID table, and calls, from the memory 203, funcB in the position indicated by the obtained address and sends this to the execution unit 214. The execution unit 214 executes funcB.

Next, the function call unit 213 obtains $X_2=6$. Since a function whose function ID is 6 does not exist, the function call unit 213 then obtains $X_3=7$. Similarly, since a function whose function ID is 7 does not exist, the function call unit 213 then obtains $X_4=4$.

The function call unit 213 determines from the function ID table 220 that a function whose function ID is 4 is funcD. Since the information stored in the call state storing unit indicates that funcC or funcC1 has yet to be executed, the function call unit 213 determines that the execution order is incorrect.

Next, the function call unit 213 obtains $X_5=5$. The function call unit 213 determines, from the function ID table 220, a function whose function ID is 5 is funcC, and determines, from information stored in the call state storing unit, that funcC has yet to be executed. In addition, the function call unit 213 also determines from the information stored in the call state storing unit that the execution order is correct. The function call unit 213 obtains the address "0x07e9900" of funcC from the function ID table, and calls, from the memory 203, funcC in the position indicated by the obtained address and sends this to the execution unit 214. The execution unit 214 executes funcC.

Next, the function call unit 213 obtains $X_6=2$. The function call unit 213 determines, from the function ID table 220, a function whose function ID is 2 is funcC1. Since the information stored in the call state storing unit indicates that funcC has been executed, the function call unit 213 determines not to execute funcC1 here.

Next, the function call unit 213 obtains $X_7=3$. The function call unit 213 obtains, from the function ID table 220, the address "0x07eb050" of funcDummy whose function ID is 3, and calls, from the memory 203, funcDummy in the position indicated by the obtained address and sends this to the execution unit 214. The execution unit 214 executes funcDummy.

Next, the function call unit 213 obtains $X_8=0$. The function call unit 213 determines that funcA whose function ID is 0 has already been executed.

Next, the function call unit 213 obtains $X_9=1$. The function call unit 213 determines that funcB whose function ID is 1 has already been executed.

Next, the function call unit 213 obtains $X_{10}=6$. Since a function whose function ID is 6 does not exist, the function call unit 213 then obtains $X_{11}=7$. Similarly, a function whose function ID is 7 does not exist, the function call unit 213 then obtains $X_{12}=4$.

The function call unit 213 determines from the function ID table 220 that a function whose function ID is 4 is funcD. Since the information stored in the call state storing unit indicates that funcB and one of funcC and funcC1 have been executed, the function call unit 213 determines that the execution order is correct. The function call unit 213 obtains the address "0x07eb010" of funcD whose function ID is 4 from the function ID table 220, and calls, from the memory 203, funcD in the position indicated by the obtained address and sends this to the execution unit 214. The execution unit 214 executes funcD.

The function call unit 213 determines processing of all functions are finished when funcD is executed, and ends the processing.

As described above, in the case of the initial value b=1, funcA, funcB, funcC, funcDummy and funcD are executed in the stated order.

242 shows an execution order of functions when the initial value b=3 is assigned to (Eq. 1). When b=3, the function call unit 213 first obtains $X_0=0$. The function call unit 213 obtains, from the function ID table 220, the address "0x07e9500" of funcA whose function ID is 0, calls, from the memory 203, funcA in the position indicated by the obtained address, and sends this to the execution unit 214. The execution unit 214 executes funcA.

Next, the function call unit 213 obtains $X_1=3$. The function call unit 213 obtains, from the function ID table 220, an address of funcDummy whose function ID is 3, and calls, from the memory 203, funcDummy in the position indicated by the obtained address and sends this to the execution unit 214. The execution unit 214 executes funcDummy.

Next, the function call unit 213 obtains $X_2=2$. The function call unit 213 determines, from the function ID table 220, a function whose function ID is 2 is funcC1.

The function call unit 213 determines, from the information stored in the call state storing unit, that both funcC1 and funcC have yet to be executed. In addition, the function call unit 213 also determines from the information stored in the call state storing unit that the execution order is correct. The function call unit 213 obtains the address of funcC1 from the function ID table 220, and calls, from the memory 203, funcC1 in the position indicated by the obtained address and sends this to the execution unit 214. The execution unit 214 executes funcC1.

Next, the function call unit 213 obtains $X_3=5$. The function call unit 213 determines, from the function ID table 220, a function whose function ID is 5 is funcC. Since the information stored in the call state storing unit indicates that funcC1 has been executed, the function call unit 213 determines not to execute funcC here.

Next, the function call unit 213 obtains $X_4=4$. The function call unit 213 determines from the function ID table 220 that a function whose function ID is 4 is funcD. Since the information stored in the call state storing unit indicates that funcB has yet to be executed, the function call unit 213 determines that the execution order is incorrect.

Next, the function call unit 213 obtains $X_5=7$. Since a function whose function ID is 7 does not exist, the function call unit 213 then obtains $X_6=6$. Similarly, since a function whose function ID is 6 does not exist, the function call unit 213 then obtains $X_7=1$.

The function call unit 213 determines, from the function ID table 220, a function whose function ID is 1 is funcB, and determines, from information stored in the call state storing unit, that funcB has yet to be executed. In addition, the function call unit 213 also determines from the information stored in the call state storing unit that the execution order is correct. The function call unit 213 obtains the address of funcB from the function ID table 220, and calls, from the memory 203, funcB in the position indicated by the obtained address and sends this to the execution unit 214. The execution unit 214 executes funcB.

Next, the function call unit 213 obtains $X_8=0$. The function call unit 213 determines that funcA whose function ID is 0 has already been executed.

Next, the function call unit 213 obtains $X_9=3$. The function call unit 213 obtains, from the function ID table 220, an address of funcDummy whose function ID is 3, and calls, from the memory 203, funcDummy in the position indicated by the obtained address and sends this to the execution unit 214. The execution unit 214 executes funcDummy.

Next, the function call unit 213 obtains $X_{10}=2$. The function call unit 213 determines that funcC1 whose function ID is 2 has already been executed.

Next, the function call unit 213 obtains $X_{11}=5$. The function call unit 213 determines, from the function ID table 220, a function whose function ID is 5 is funcC. Since the information stored in the call state storing unit indicates that funcC1 has been executed, the function call unit 213 determines not to execute funcC here.

Next, the function call unit 213 obtains $X_{12}=4$. The function call unit 213 determines, from the function ID table 220, a function whose function ID is 4 is funcD. Since the information stored in the call state storing unit indicates that funcB and one of funcC or funcC1 have been executed, the function call unit 213 determines that the execution order is correct. The function call unit 213 obtains the address of funcD whose function ID is 4 from the function ID table 220, and calls, from the memory 203, funcD in the position indicated by the obtained address and sends this to the execution unit 214. The execution unit 214 executes funcD.

The function call unit 213 determines processing of all functions is finished when funcD is executed, and ends the processing.

As described above, in the case of the initial value b=3, funcA, funcDummy, funcC1, funcB, funcDummy, and funcD are executed in the stated order.

243 shows the order of functions to be executed when the initial value b=5 is assigned to (Eq. 1). In the case of the initial value b=5, funcA, funcC, funcDummy, funcB, funcDummy, and funcD are executed in the stated order.

244 shows the order of functions to be executed when the initial value b=7 is assigned to (Eq. 1). In the case of the initial value b=7, funcA, funcC1, funcB, and funcD are executed in the stated order.

7. Grouping of Functions in Accordance with their Attributes

As has been described, the program conversion unit 102 of the program generation apparatus 10 analyzes an original program, and informs the program generation unit 104 of a function structure which is the result of the analysis.

Here, the program generation apparatus 10 may analyze an original program and generate a program executable format that decides the execution order of functions according to function groups created by grouping functions based on an attribute of each function included in the original program.

Figure 17:
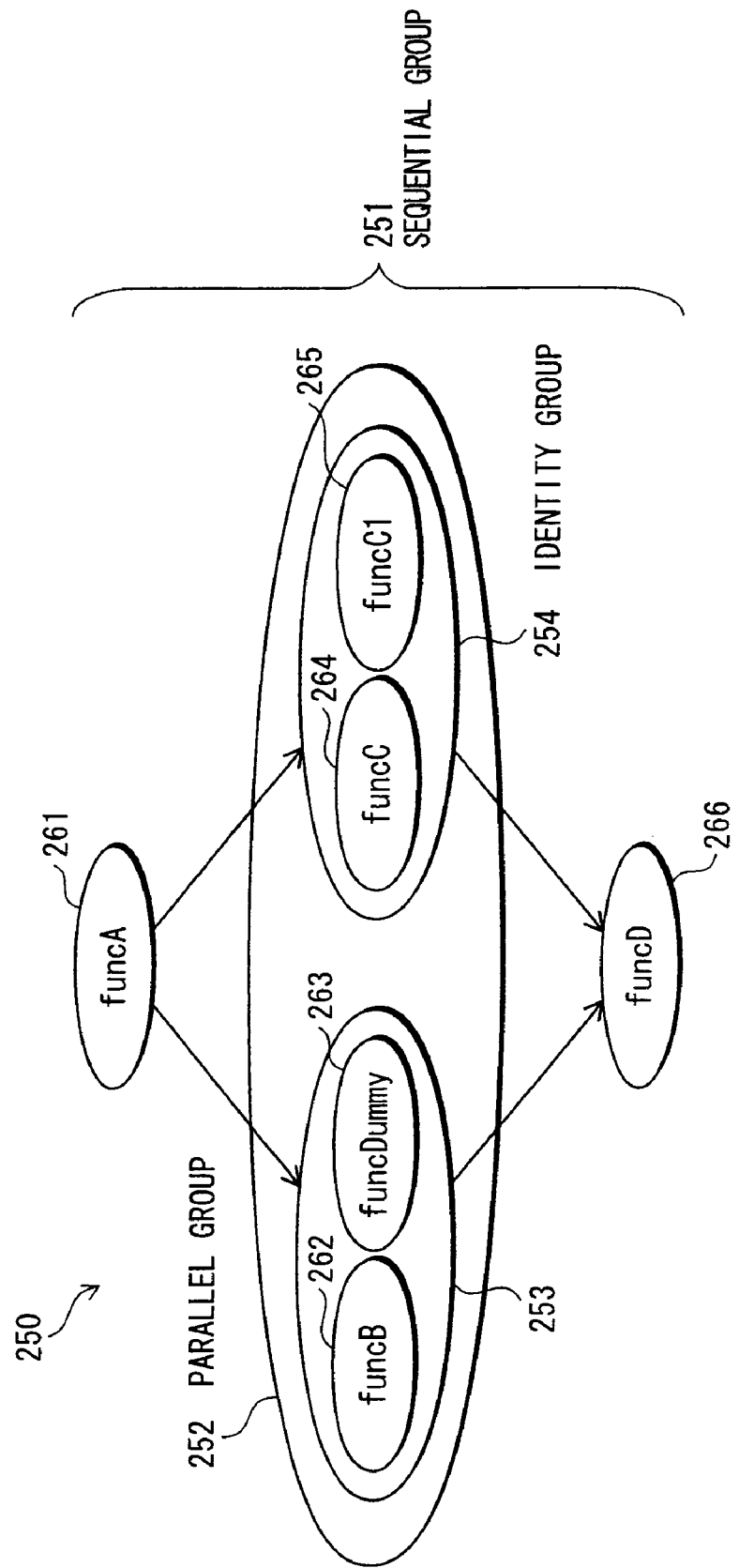
FIG. 17 shows a function structure 250 and illustrates a method of deciding a call order of each function based on a function group.

Here is described a method of deciding the execution order of functions according to the function groups using a function structure 250 shown in FIG. 17. As shown in the figure, the function structure 250 includes a sequential group 251, a parallel group 252, and an identity group 254.

The sequential group 251 is composed of funcA 261, the parallel group 252 and funcD 266.

The parallel group 252 is composed of a group 253 and the identity group 254.

The identity group 254 is composed of funcC 264 and funcC1 265.

The program generation apparatus 10 generates a function call program for executing the sequential group 251 in the following manner: 261, 252 and 266 are executed in the stated order; regarding the parallel group 252, the group 253 and the identity group 254 are executed in the order randomly decided at the execution; regarding the identity group 254, one of funcC 264 and funcC1 265 is randomly selected and executed; and funcDummy 263 is decided whether to be executed, and when funcDummy 263 is decided to be executed, it is then decided randomly at the execution how many times funcDummy 263 is to be executed.

The program execution apparatus 20 executes the function call program generated by the program generation apparatus 10 and thereby executes functions in an order different for each execution.

Embodiment 2

An information processing system 2 is explained next as the second embodiment of the present invention.

The information processing system 2 is characterized by generating multiple execution path patterns at the generation of the program executable format, and selecting and executing one of the generated multiple execution path patterns at the execution of the program.

1. Overall Configuration

Figure 18:
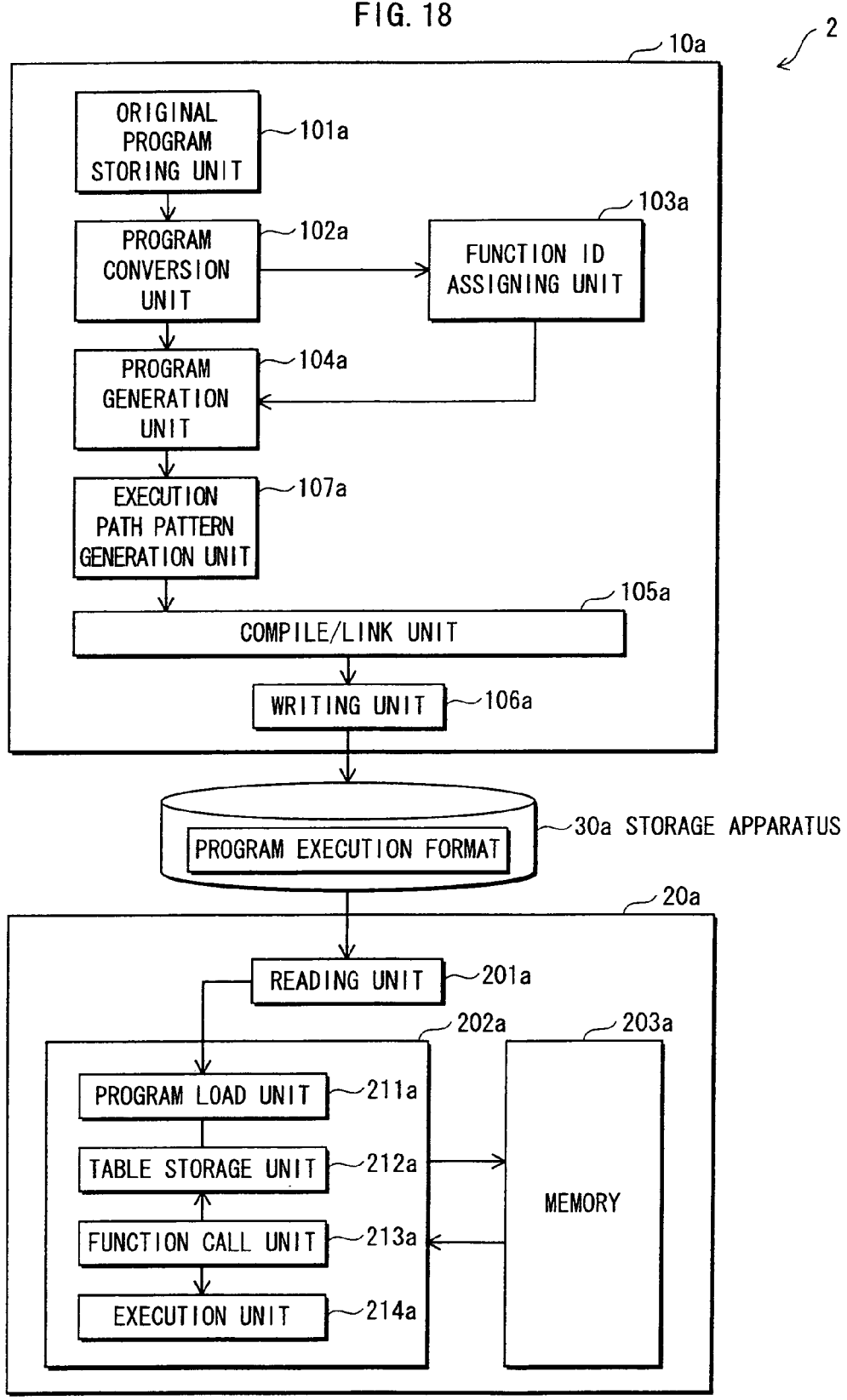

FIG. 18 shows a configuration of the information processing system 2. As shown in the figure, the information processing system 2 comprises: a program generation apparatus 10a; a program execution apparatus 20a; and a storage apparatus 30a.

The program generation apparatus 10a and program execution apparatus 20a are both computer systems similarly to the program generation apparatus 10 and program execution apparatus 20 of Embodiment 1, and the storage apparatus 30a is an optical disk.

2. Overall Operations

Figure 19:
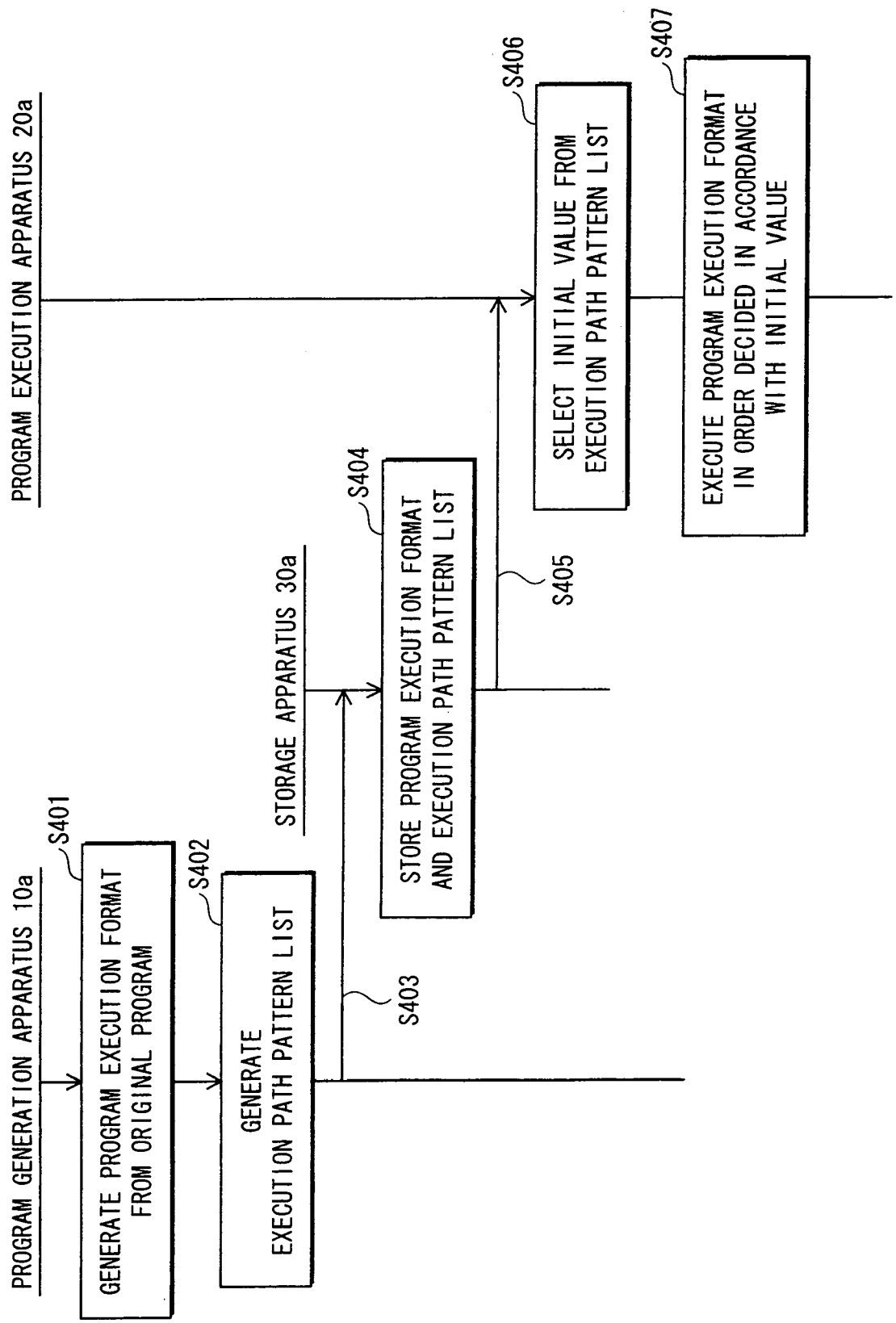
FIG. 19 is a flowchart showing overall operations of the information processing system 2.

The overall operations of the information processing system 2 are explained here with the aid of the flowchart of FIG. 19.

The program generation apparatus 10a generates a program executable format from an original program (S401), and subsequently generates an execution path pattern list (Step S402). The program generation apparatus 10a writes the generated program executable format and execution path pattern list to the storage apparatus 30a (Step S403).

The storage apparatus 30a stores therein the program executable format and execution path pattern list (Step S404).

The program execution apparatus 20a reads a program executable format and an execution path pattern list from the storage apparatus 30a (Step S405). The program execution apparatus 20a selects an initial value from the execution path pattern list (Step S406), and executes each process of the program executable format in the order determined in accordance with the selected initial value (Step S407).

3. Configuration of Program Generation Apparatus 10a

The configuration of the program generation apparatus 10a is explained here with the aid of FIG. 18. As shown in the figure, the program generation apparatus 10a comprises: an original program storing unit 101a; a program conversion unit 102a; a function ID assigning unit 103a; a program generation unit 104a; a compile/link unit 105a; a writing unit 106a; and an execution path pattern generation unit 107a.

The program generation apparatus 10a has a configuration in which the execution path pattern generation unit 107a is added to the program generation apparatus 10 of FIG. 1.

The original program storing unit 101a, program conversion unit 102a, function ID assigning unit 103a, program generation unit 104a, compile/link unit 105a and writing unit 106a have the same functions as the original program storing unit 101, program conversion unit 102, function ID assigning unit 103, program generation unit 104, compile/link unit 105 and writing unit 106, individually.

That is, the original program storing unit 101a has the original program of FIG. 3, and the program conversion unit 102a converts the original program 110 to generate the function data 120 of FIG. 7. The function ID assigning unit 103a assigns an identifier to each function included in the function data 120 and generates the function ID table 130 of FIG. 8. The program generation unit 104a generates the function call program 140 of FIG. 9 and the function call order-determining program 150 of FIG. 10.

The execution path pattern generation unit 107a is an component distinguishing the program generation apparatus 10a of the 2nd embodiment, as described above. The execution path pattern generation unit 107a generates an execution path pattern list. The execution path pattern generation unit 107a receives the function call program 140 and function call order-determining program 150 generated by the program generation unit 104a and outputs, to the compile/link unit 105a, the received function call program 140 and function call order-determining program 150 and the generated execution path pattern list.

FIG. 20 shows a data configuration of an execution path pattern list 300. The execution path pattern list 300 is a specific example of an execution path pattern list generated by the execution path pattern generation unit 107a. As shown in the figure, the execution path pattern list 300 comprises four pieces of pattern information 301, 302, 303 and 304. Each pattern information piece includes an index, an execution path pattern value and a flag.

The execution path pattern values each associated with an index is a random number generated by the execution path pattern generation unit 107a. The flags are set to either 0 or 1, where 0 indicates that the associated execution path pattern value has not been selected at the execution of the program execution format performed by the program execution apparatus 20a and 1 indicates that the associated execution path pattern value has already been selected.

The compile/link unit 105a receives from the execution path pattern generation unit 107a, the function call program 140, the function call order-determining program 150 and the execution path pattern list. The compile/link unit 105a compiles and links these received programs and data to thereby generate a program executable format. The compile/link unit 105a outputs the generated program executable format to the writing unit 106a.

The writing unit 106a writes the program executable format output from the compile/link unit 105a to the storage apparatus 30a.

4. Operations for Generation Execution Path Pattern List

Figure 21:
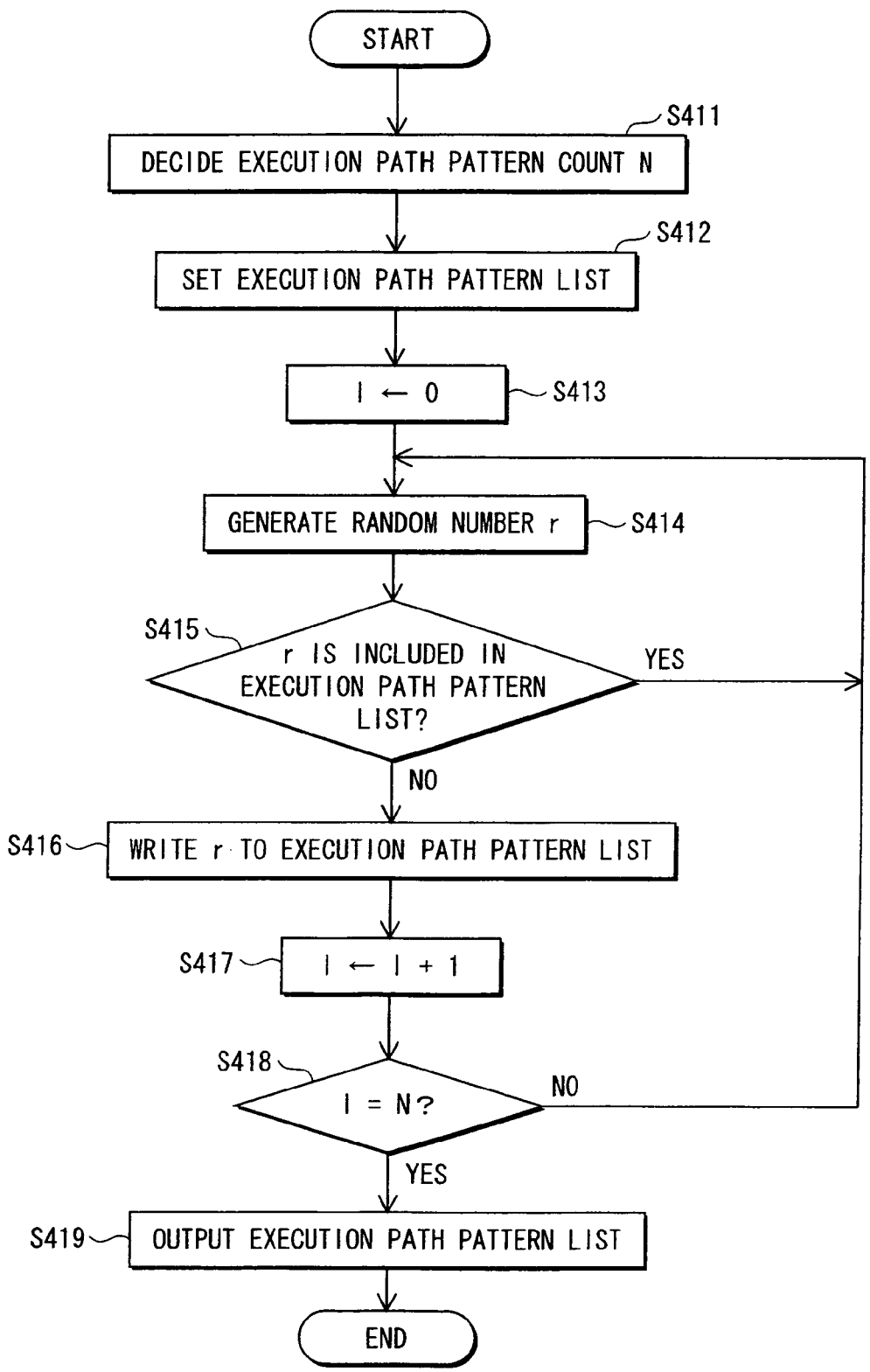

The operations of the execution path pattern list generation processing performed by the program generation apparatus 10a is described here with the aid of the flowchart of FIG. 21.

First, the execution path pattern generation unit 107a of the program generation apparatus 10a decides the execution path pattern count N (Step S411). As to the execution path pattern count N, a predetermined number prestored in the execution path pattern generation unit 107a may be used as N, or alternatively, a value input to an external input apparatus by the user may be received and used as N. Here, in the case of making the execution path pattern generation unit 107a generate the execution path pattern list 300 of FIG. 20, the execution path pattern count needs to be N=4.

Next, the execution path pattern generation unit 107a sets the execution path pattern list therein (Step S412). As to the execution path pattern list set here, the column of the index includes numerical values from 0 to (N−1) in order beginning from the top of the column. In the column of the flag, 0 is written to all. The column of the execution path pattern value is blank with no data being written.

Subsequently, the execution path pattern generation unit 107a sets l=0 (Step S413), and generates a random number r (Step S414). The execution path pattern generation unit 107a judges whether the random number r generated in Step S414 has already been included in the execution path pattern values of the execution path pattern list (Step S415). In the case where r is included in the execution path pattern list (YES in Step S415), the execution path pattern generation unit 107a returns to Step S414 and proceeds processing. In the case where r is not included in the execution path pattern list (NO in Step S415), the execution path pattern generation 107a writes r into the execution path pattern list (Step S416).

Then, the execution path pattern generation unit 107a sets l=l+1 (Step S417), and judges whether l and N match each other (Step S418). N represents the execution path pattern count decided in Step S411.

In the case of l≠N (NO in Step S418), the execution path pattern generation 107a returns to Step S414 and proceeds processing. When l=N (YES in Step S418), which means that an execution path pattern list including therein the count of the execution path pattern values that matches the execution path pattern count N has been generated, the execution path pattern generation unit 107a outputs the generated execution path pattern list to the compile/link unit 105a (Step S419).

5. Configuration of Program Execution Apparatus 20a

The program execution apparatus 20a is an apparatus for reading a program executable format from the storage apparatus 30a and executing the read program executable format.

As shown in FIG. 18, the program execution apparatus 20a comprises: a reading unit 201a; a program execution unit 202a; and a memory 203a. The program execution unit 202a includes therein a program load unit 211a, a table storage unit 212a, a function call unit 213a, and an execution unit 214a.

The function of each component is the same as a counterpart of the program execution apparatus 20 of Embodiment 1.

The program execution apparatus 20 disclosed in Embodiment 1 generates, at the execution of a program, a random number which is used as an initial value, and executes the program in the order decided in accordance with the initial value. On the other hand, the program execution apparatus 20a of the present embodiment selects, at the execution of a program, one execution path pattern value from the execution path pattern list of FIG. 20, which is used as an initial value, and executes the program in the order decided in accordance with the initial value.

6. Operations of Program Execution Process

Figure 22:
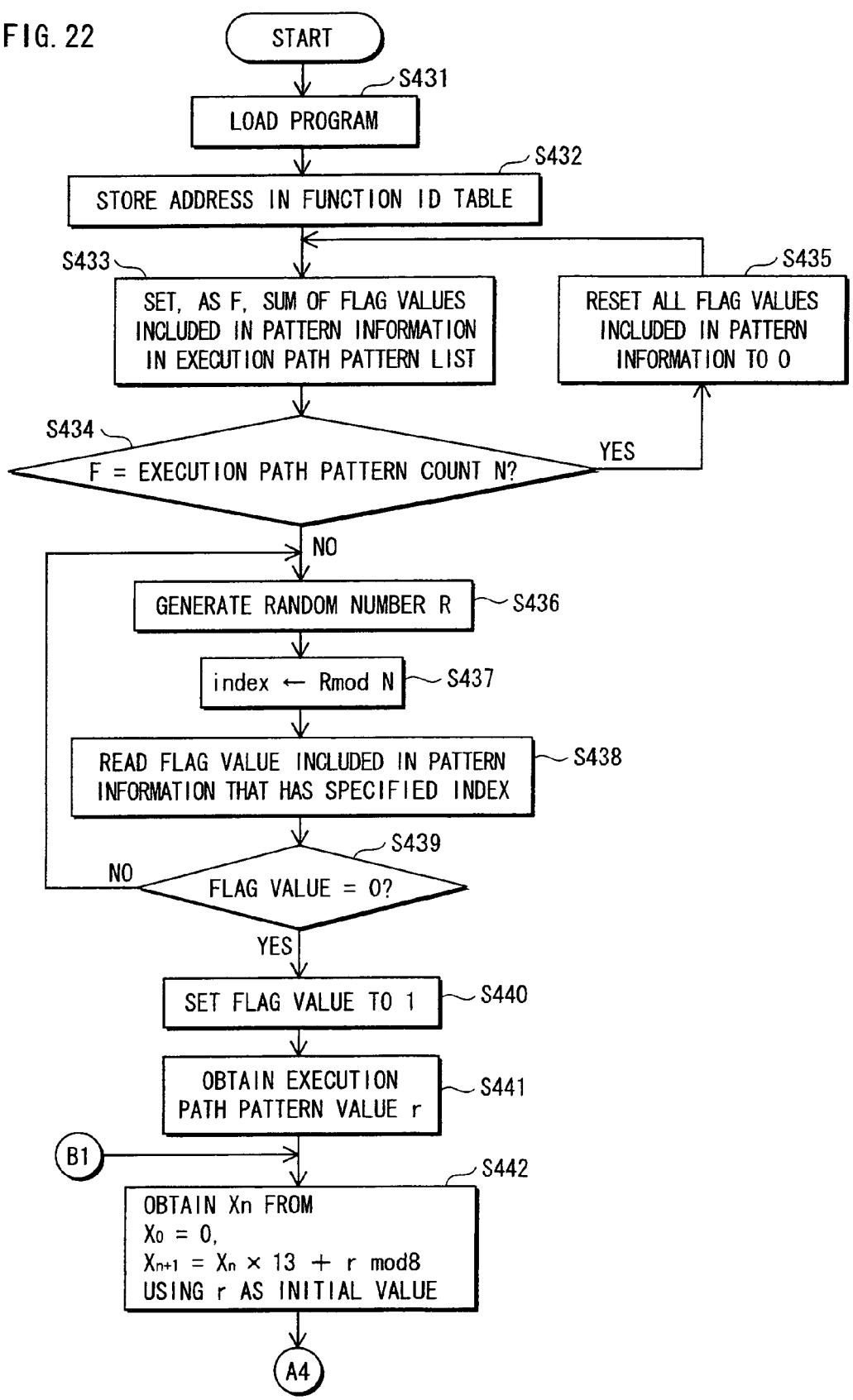
FIG. 22 is a flowchart showing operations of a program execution process in the program execution apparatus 20a (continuing to FIG. 23)
Figure 23:
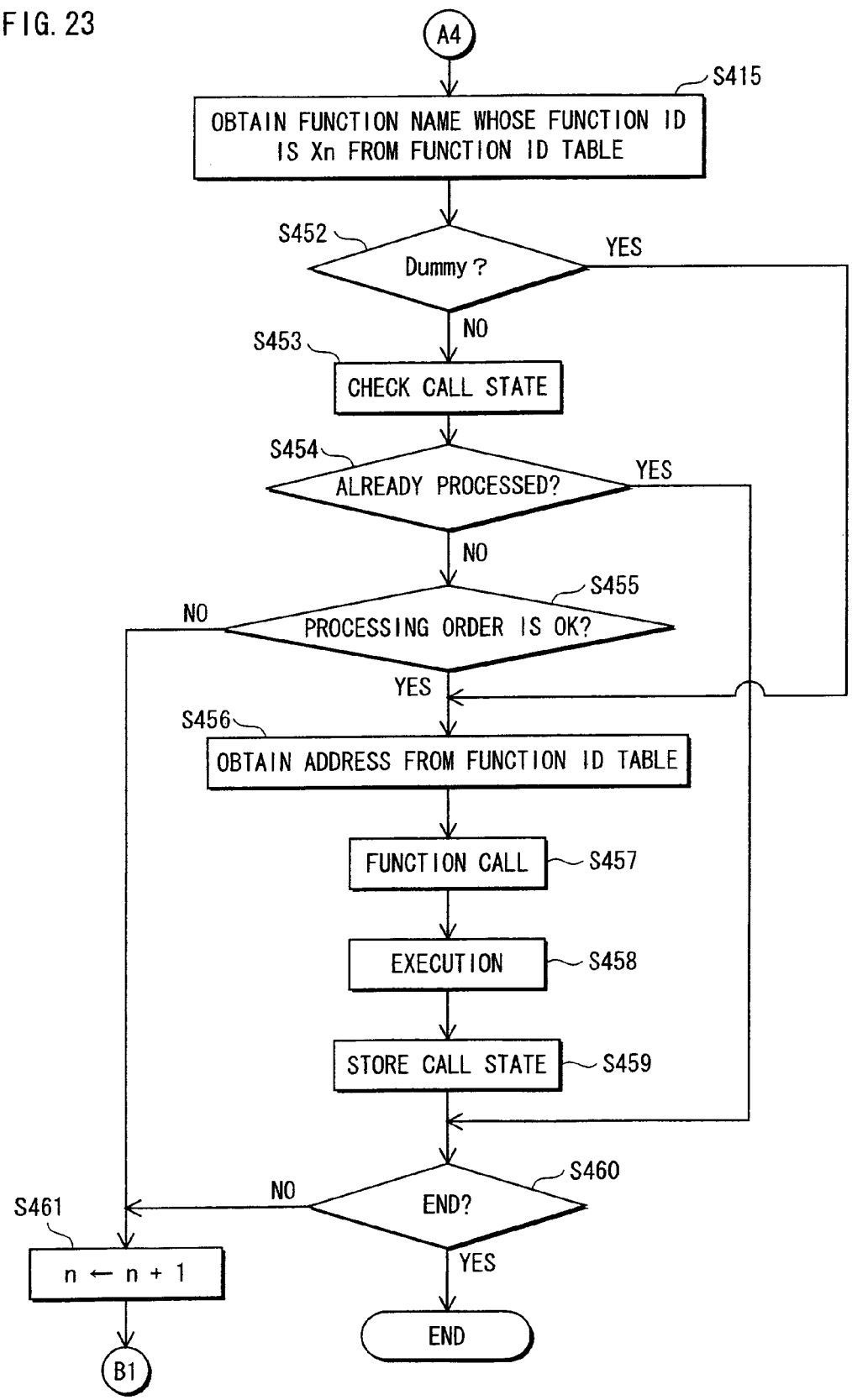
FIG. 23 is a flowchart showing operations of the program execution process in the program execution apparatus 20a (continued from FIG. 22)

FIGS. 22 and 23 are flowcharts showing operations of the program execution process performed by the program execution apparatus 20a. Here, as a specific example, the function ID table 130 (FIG. 8), the function call program 140 (FIG. 9), the function call order-determining program 150 (FIG. 10) and the execution path pattern list 300 (FIG. 20) are stored in the storage apparatus 30a.

First, the reading unit 201a of the program execution apparatus 20a reads the function call program 140 and the function call order-determining program 150 from the storage apparatus 30a. The program load unit 211a loads into the memory 203a, the function call program 140 and function call order-determining program 150 read by the reading unit 201a (Step S431).

Furthermore, the reading unit 201a reads the function ID table 130 from the storage apparatus 30a. The program load unit 211a stores addresses, each of which indicates the position of a function in the memory 203a, in the function ID table 130 (Step S432) to generate the function ID table 220 (FIG. 12). The table storage unit 212a stores therein the generated function ID table 220.

The program execution apparatus 20a also reads the execution path pattern list 300 from the storage apparatus 30a and stores the read execution path pattern list 300 in the memory 203a.

Next, the function call unit 213a of the program execution unit 202a adds up values of flags, each of which is included in respective pattern information in the execution path pattern list 300, and sets the sum total as F (Step S433). The function call unit 213a judges whether F matches the execution path pattern value N (Step S434). Here, the execution path pattern count of the execution path pattern list 300 is N=4.

In the case of F=N (YES in Step S434), the function call unit 213a resets all the flag values included in the respective pattern information in the execution path pattern list 300 to 0 (Step S435). Subsequently, the function call unit 213a proceeds to Step S433 and proceeds processing.

In the case of F≠N (NO in Step S434), the function call unit 213a generates a random number R (Step S436), and specifies a value of R mod N as the index (Step S437). R mod N represents a remainder obtained by dividing R by N. The function call unit 213a reads, from the execution path pattern list 300 stored in the memory 203a, a flag value included in pattern information that has the specified index (Step S438).

In the case when the flag value is 1 (NO in Step S439), the function call unit 213a returns to Step S436 and proceeds processing.

In the case when the flag value is 0 (YES in Step S439), the function call unit 213a sets the flag value by changing from 0 to 1 (Step S440), reads an execution path pattern value associated with the specified index from the execution path pattern list 300 (Step S441), and sets the read execution path pattern value as r.

The function call unit 213a obtains $X_n$ from the following equations using the execution path pattern value r as the initial value (Step S442):

$X_0=0$; and $X_{n+1}=(X_n*13+r) \bmod 8$.

The function call unit 213a obtains, from the function ID table 220 stored in the table storage unit 212a, a function name whose function ID is the same as $X_n$ acquired in Step S442 (Step S451). In the case where the function name obtained in Step S451 is funcDummy (YES in Step S452), the function call unit 213a proceeds to Step S456 and proceeds processing. In the case where the function name is not funcDummy (NO in Step S452), the function call unit 213a checks the call state (Step S453). Specifically speaking, the function call unit 213a judges whether the call state storing unit located internally has the same function name as one obtained in Step S451. Here, suppose that the call state storing unit has the same information as one stored in the call state storing unit of the function call unit 213 in the program execution apparatus 20 of Embodiment 1.

In the case where the call state storing unit stores therein the same function name, which namely means that a function having the function name obtained in Step S451 has already processed (YES in Step S454), the function call unit 213a proceeds to Step 460 and proceeds processing. In the case where the call state storing unit does not store the same function name, which namely means that a function having the function name obtained in Step S451 has yet to be processed (NO in Step S454), the function call unit 213a checks the function structure of the call state storing unit.

For example, funcD will not be processed if funcB and one of funcC and funcC1 have not been processed.

When the processing order of the function name obtained in Step S451 is not correct (NO in Step S455), the function call unit 213a proceeds to Step S461 and proceeds processing. When the processing order is correct (YES in Step S455), the function call unit 213a obtains, from the function ID table 220 stored in the table storage unit 212a, an address of the function name obtained in Step S451—i.e. an address indicating the position, in the memory, of a function corresponding to the same function ID as $X_n$ obtained in Step S442 (Step S456).

Next, the function call unit 213a calls a function from a position in the memory 203a, indicated by the address obtained in Step S456 (Step S457), and sends the function to the execution unit 214a. The execution unit 214a receives the function from the function call unit 213a and executes this (Step S458). Subsequently, the function call unit 213a stores the function name of the executed function in the call state storing unit as a processed function (Step S459).

Based on whether functions required to be executed have all been processed, the function call unit 213a judges whether to end the process (Step S460). In the case where all the functions have been processed, the function call unit 213a determines to end the process (YES in Step S460) and then ends the process. If there are unprocessed functions (NO in Step S460), the function call unit 213a sets n+1 to n (Step S461), returns to Step S442, and proceeds processing.

Embodiment 3

An information processing system 3 is explained next as Embodiment 3 of the present invention.

The information processing system 3 is characterized by generating a program executable format, testing the generated program executable format whether it operates appropriately, extracts multiple execution path patterns which operate appropriately, and selecting and executing one of the appropriately-operating execution path patterns at the execution of the program.

1. Overall Configuration

Figure 24:
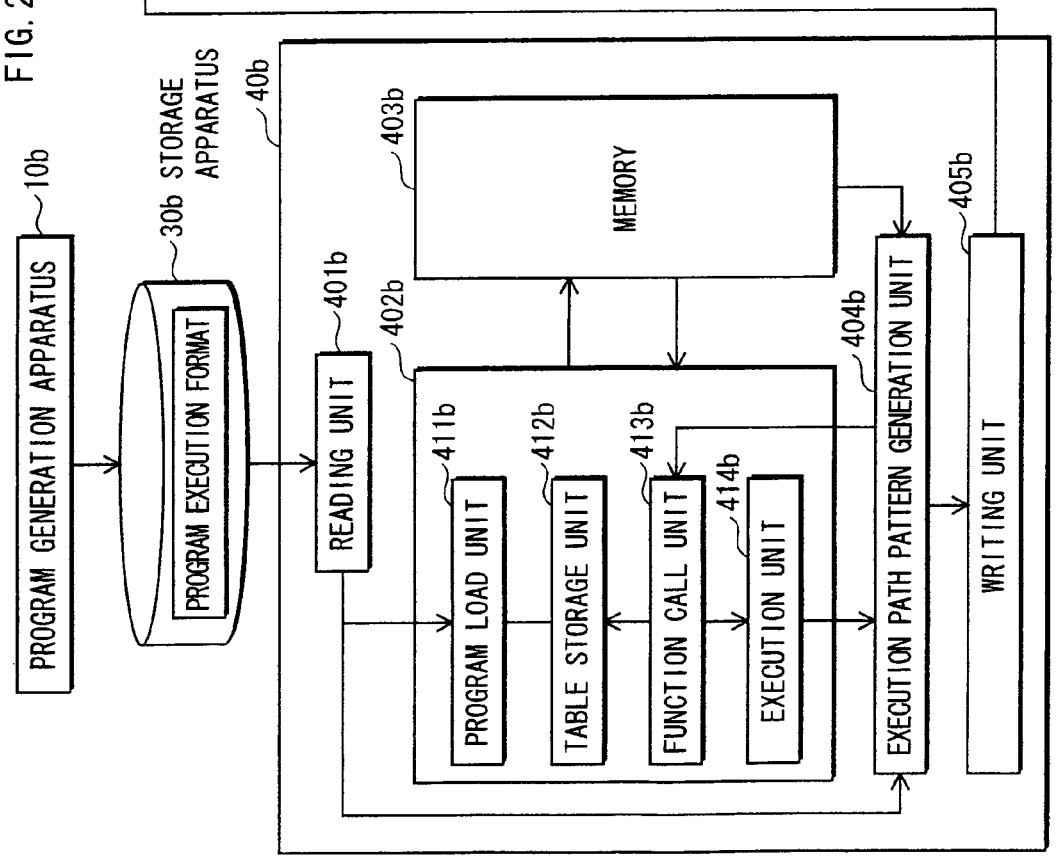
FIG. 24 shows a system configuration of an information processing system 3 according to Embodiment 3, and is a functional block diagram functionally showing internal configurations of a program testing apparatus 40b and a program execution apparatus 20b.

FIG. 24 shows a configuration of the information processing system 3. As shown in the figure, the information processing system 3 comprises: a program generation apparatus 10b; a program execution apparatus 20b; a storage apparatus 30b; a program testing apparatus 40b; and a storage apparatus 50b.

The program generation apparatus 10b, program execution apparatus 20b, and program testing apparatus 40b are computer systems. The storage apparatuses 30b and 50b are optical disks.

The program generation apparatus 10b has the same configuration and function as the program generation apparatus 10 (FIG. 1) disclosed in Embodiment 1. The program execution apparatus 20b has the same configuration and function as the program execution apparatus 20a disclosed in Embodiment 2. The program testing apparatus 40b is a component unique to Embodiment 3.

2. Overall Operations

Figure 25:
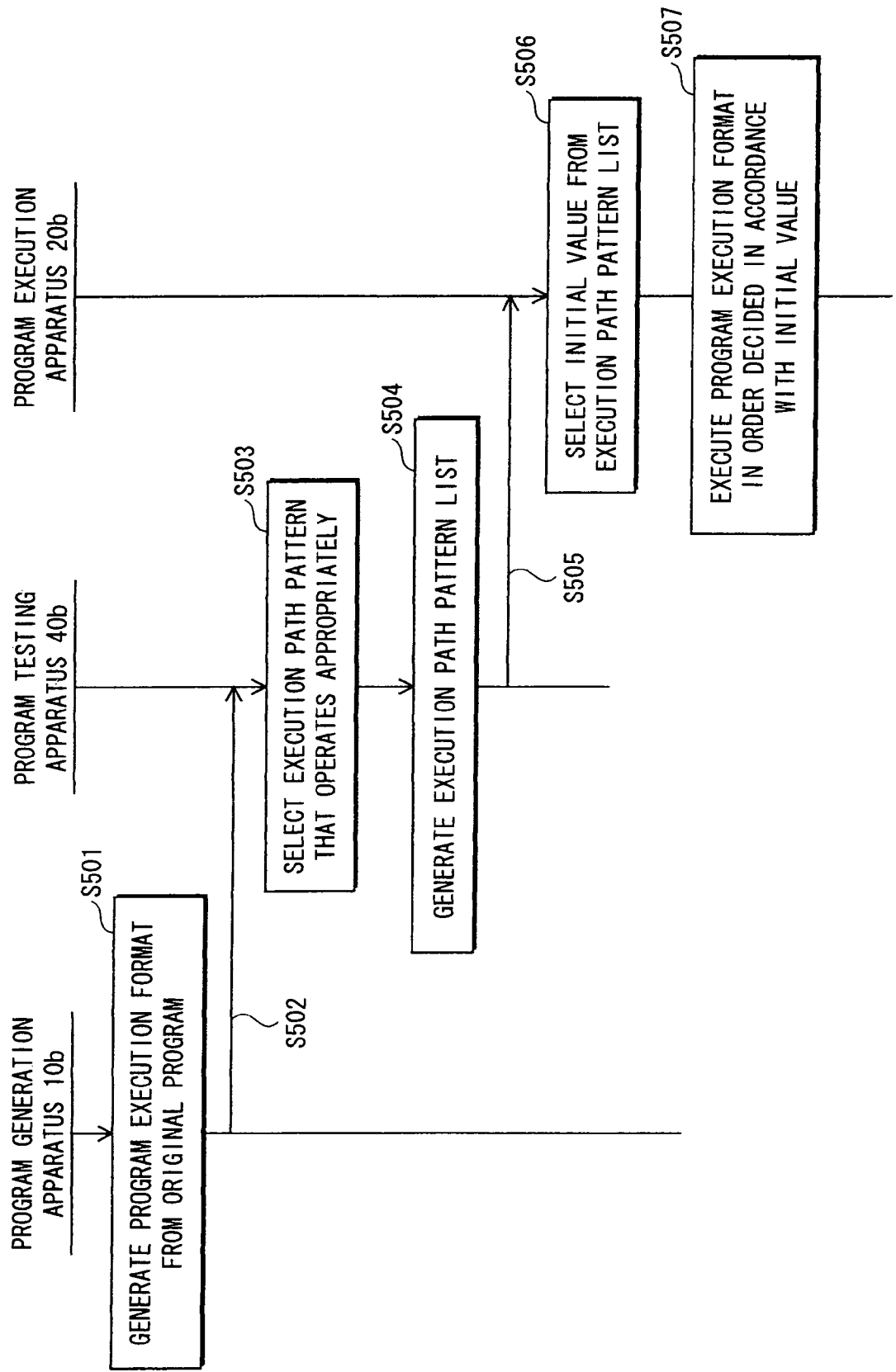
FIG. 25 is a flowchart showing overall operations of the information processing system 3.

FIG. 25 is a flowchart showing overall operations of the information processing system 3.

The program generation apparatus 10b generates a program executable format from an original program (Step S501). The program generation apparatus 10b sends the generated program executable format to the program testing apparatus 40a via the storage apparatus 30b (Step S502).

The program testing apparatus 40b reads a program executable format from the storage apparatus 30b and executes this. The program testing apparatus 40b selects multiple execution path patterns which operate appropriately (Step S503), and generates an execution path pattern list (Step S504). The program testing apparatus 40b sends the program executable format and the execution pattern list to the program execution apparatus 20b via the storage apparatus 50b (Step S505).

The program execution apparatus 20b reads the program executable format and execution path pattern list from the storage apparatus 50b. The program execution apparatus 20b selects an initial value from the execution path pattern list (Step S506), and executes each process of the program executable format in the order decided in accordance with the selected initial value (Step S507).

3. Configuration and Operations of Program Generation Apparatus 10b

Since the program generation apparatus 10b has the same configuration as the program generation apparatus 10 (FIG. 1) disclosed in Embodiment 1, a graphic representation of the internal configuration of the program generation apparatus 10b is not given.

That is, the program generation apparatus 10b comprises an original program storing unit, a program conversion unit, a function ID assigning unit, a program conversion unit, a compile/link unit and a writing unit.

The original program storing unit has the original program 110 shown in FIG. 3 and the execution results of the original program 110. The original program storing unit sends the original program 110 to the program conversion unit while sending the execution results of the original program 110 to the writing unit.

The program conversion unit generates the function data 120 shown in FIG. 7 by converting the original program 110. The function ID assigning unit assigns an identifier to each function included in the function data 120 and generates the function ID table 130 of FIG. 8. The program generation unit generates the function call program 140 of FIG. 9 and the function call order-determining program 150 of FIG. 10.

The compile/link unit receives the function call program 140 and function call order-determining program 150 from the program generation unit. The compile/link unit compiles and links these received programs and data to thereby generate a program executable format. The compile/link unit outputs the generated program executable format to the writing unit.

The writing unit writes the program executable format output from the compile/link unit to the storage apparatus 30b. In addition, the writing unit writes to the storage apparatus 30b, the execution results of the original program 110 output from the original program storing unit.

Note that the operations of the program executable format generation process performed by the program generation apparatus 10b are the same as those performed by the program generation apparatus 10, and therefore the description is omitted here.

4. Configuration of Program Testing Apparatus 40b

The program testing apparatus 40b comprises, as shown in FIG. 24: a reading unit 401b; a program execution unit 402b; a memory 403b; an execution path pattern generation 404b; and a writing unit 405b. The program execution unit 402b includes therein a program load unit 411b, a table storage unit 412b, a function call unit 413b, and an execution unit 414b.

That is, the program testing apparatus 40b has a configuration in which the execution path pattern generation unit 404b and writing unit 405b are added to the program execution apparatus 20 (FIG. 1) disclosed in Embodiment 1.

The reading unit 401b reads the program executable format and the execution results of the original program 110 from the storage apparatus 30b, and sends the execution results to the execution path pattern generation unit 404b while sending the program executable format to the program load unit 411b.

The program load unit 411b receives the program executable format from the reading unit 401b, and loads into the memory 403b, the function call program 140 and function call order-determining program 150 in the received program executable format.

The program load unit 411b also adds addresses, each of which indicates the position of a function included in the function call program 140 loaded into the memory 403b, to the function ID table 130 and thereby generates the function ID table 220 shown in FIG. 12. The program load unit 411b stores the generated function ID table 220 in the table storage unit 412b.

The table storage unit 412b receives the function ID table 220 from the program load unit 411b and stores it therein.

As in Embodiments 1 and 2, the function call unit 413b has a call state storing unit, which stores therein the information described in the above embodiments.

The function call unit 413b receives an initial value r from the execution path pattern generation unit 404b, calls functions from the memory 403b in the order decided in accordance with the received initial value r, and sends them to the execution unit 414b.

The execution unit 414b executes functions received from the function call unit 413b. In addition, the execution unit 414b sends the execution results of the program to the execution path pattern generation unit 404b.

The execution path pattern generation unit 404b has the same function as the execution path pattern generation unit 107a which is a component of the program generation apparatus 10a disclosed in Embodiment 2. That is, the execution path pattern generation unit 404b generates an execution path pattern list.

The execution path pattern generation unit 404b differs from the execution path pattern generation unit 107a in comparing the result of the program executable format executed based on the generated execution path pattern and the execution result of the original program 110, and generates a list consisting only of execution path patterns with the two execution results that have been determined to match in the comparison. On the other hand, the execution path pattern generation unit 107a only generates multiple execution path patterns, and does not examine whether the generated execution path patterns individually matches the execution results of the original program 110.

The execution path pattern generation unit 404b sends the generated execution path pattern list to the writing unit 405b.

The writing unit 405b writes to the storage apparatus 50b, the execution path pattern list generated by the execution path pattern generation unit 404b and the program executable format stored in the memory 403b.

The memory 403b is, specifically speaking, structured with RAM and ROM, and stores the function call program 140 and the function call order-determining program 150 written thereto by the program load unit 411b.

5. Operations of Execution Path Pattern List Generation Process

Figure 26:
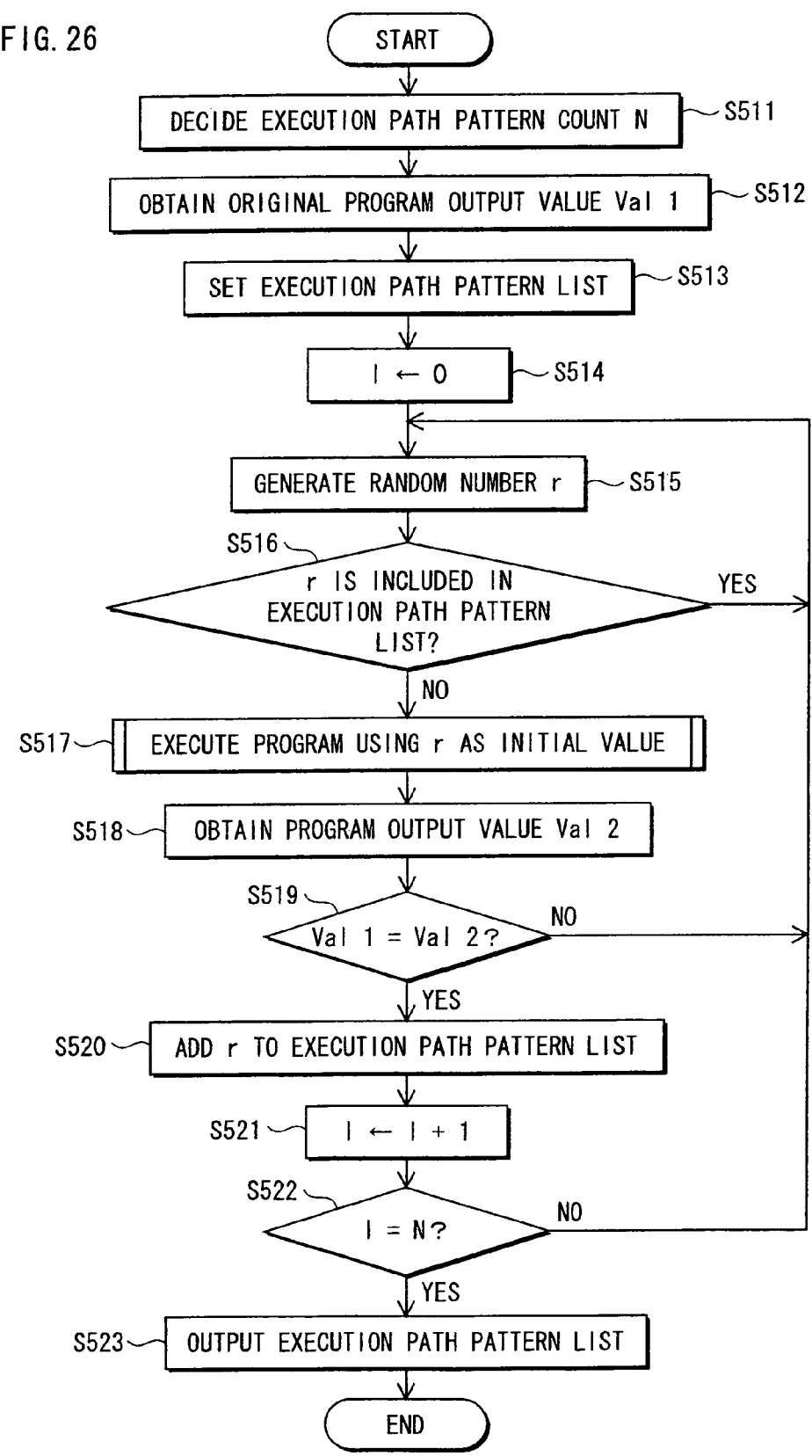
FIG. 26 is a flowchart showing operations of an execution path pattern list generation process in the program testing apparatus 40b.

The execution path pattern list generation process performed by the program testing apparatus 40b are described here with the aid of the flowchart of FIG. 26.

The execution path pattern generation unit 404b decides the execution path pattern count N (Step S511). The execution path pattern generation unit 404b also obtains an execution result Val1 of the original program 110 from the storage apparatus 30b via the reading unit 401b (Step S512).

Next, the execution path pattern generation unit 404b sets therein the execution path pattern list (Step S513). As to the execution path pattern list set here, the column of the index includes numerical values from 0 to (N−1) in order beginning from the top of the column. In the column of the flag, 0 is written to all. The column of the execution path pattern value is blank with no data being written.

Subsequently, the execution path pattern generation unit 404b sets l=0 (Step S514), and generates a random number r (Step S515). The execution path pattern generation unit 404b judges whether the random number r generated in Step S515 has already included in the execution path pattern values of the execution path pattern list (Step S516). In the case where r is included in the execution path pattern list (YES in Step S516), the execution path pattern generation unit 404b returns to Step S515 and proceeds processing. In the case where r is not included in the execution path pattern list (NO in Step S516), the program execution unit 402b performs the execution process of the program executable format using r as an initial value (Step S518).

Since the operation of Step S518 in the program execution process is the same as the operations from Steps S441 to S460 of the flowcharts shown in FIGS. 22 and 23, the detailed explanation is left out.

The execution path pattern generation unit 404b receives an execution result Val2 of the program executable format from the execution unit 414b (Step S518). The execution path pattern generation unit 404b compares the execution result Val1 of the original program 110 and the execution result Val2 of the program executable format performed using the initial value r (Step S519).

When Val1≠Val2 (NO in Step S519), the execution path pattern generation unit 404b returns to Step S515 and proceeds processing.

When Val1=Val2 (YES in Step S519), the execution path pattern generation unit 404b writes r into the execution path pattern list (Step S520).

Then, the execution path pattern generation unit 404b sets l=l+1 (Step S521), and judges whether l and N match each other (Step S522). N represents the execution path pattern count decided in Step S511.

In the case of l≠N (NO in Step S522), the execution path pattern generation 404b returns to Step S515 and proceeds processing. When l=N (YES in Step S522), which means that an execution path pattern list including therein the count of the execution path pattern values that matches the execution path pattern count N has been generated, the execution path pattern generation unit 404b outputs the generated execution path pattern list to the writing unit 405b.

6. Configuration and Operations of Program Execution Apparatus 20b

The program execution apparatus 20b comprises, as shown in FIG. 24: a reading unit 201b; a program execution unit 202b; and a memory 203b. The program execution unit 202b includes a program load unit 211b, a table storage unit 212b, a function call unit 213b and an execution unit 214b.

The function of each component of the program execution apparatus 20b is the same as a counterpart of the program execution apparatus 20a disclosed in Embodiment 2. That is, the program execution apparatus 20b selects one execution path pattern value from the execution path pattern list stored in the memory 203b at the execution of a program, uses the selected execution path pattern value as an initial value, and executes the program in the order decided in accordance with the initial value.

Other Modifications

The present invention has been explained based on the above embodiments; however, it is a matter of course that the present invention is not limited to these embodiments, and the following cases are also within the scope of the invention.

(1) In the above embodiments, the program generation apparatus converts each instruction into a function, and generates a program for calling each function using an equation of the linear congruential method and a switch statement; however, the program generated by the program generation apparatus of the present invention is not limited to this. The case in which, for example, the program generation apparatus generates a program for executing each instruction using a switch statement and go to statements, without converting each instruction into a function, as shown in FIGS. 27A and 27B is also within the scope of the present invention.

A program 401 of FIG. 27A is structured by deleting funcA, funcB, funcC1, funcC, funcD and funcDummy from the function call program 140 of FIG. 9. A program 402 of FIG. 27B decides the call order, makes a jump with a got statement, and executes an instruction.

(2) In the above embodiments, pseudo random numbers are used to decide the call order of functions; however, it is a matter of course that the method of deciding the call order of functions in the present invention is not limited to the use of pseudo random numbers. Other methods can be employed as long as they allows, by providing an initial value, the subsequent states to be decided randomly.

As a way of deciding the call order of functions, a chaos function, for example, may be used. A chaos function is characterized by behaving in a very complicated, irregular and unstable manner and making the estimation of the next state impossible, although it is based on a deterministic system where the entire subsequent states are principally decided once a state (i.e. initial value) at one point is decided.

Alternatively, a cellular automaton, for example, may be used to decide the call order of functions. A cellular automaton is a mathematical model in which discrete states change in discrete time steps according to a set regulation, and is characterized in that the state of n is decided from the initial value and the state of the neighborhood n−1.

Figure 28:
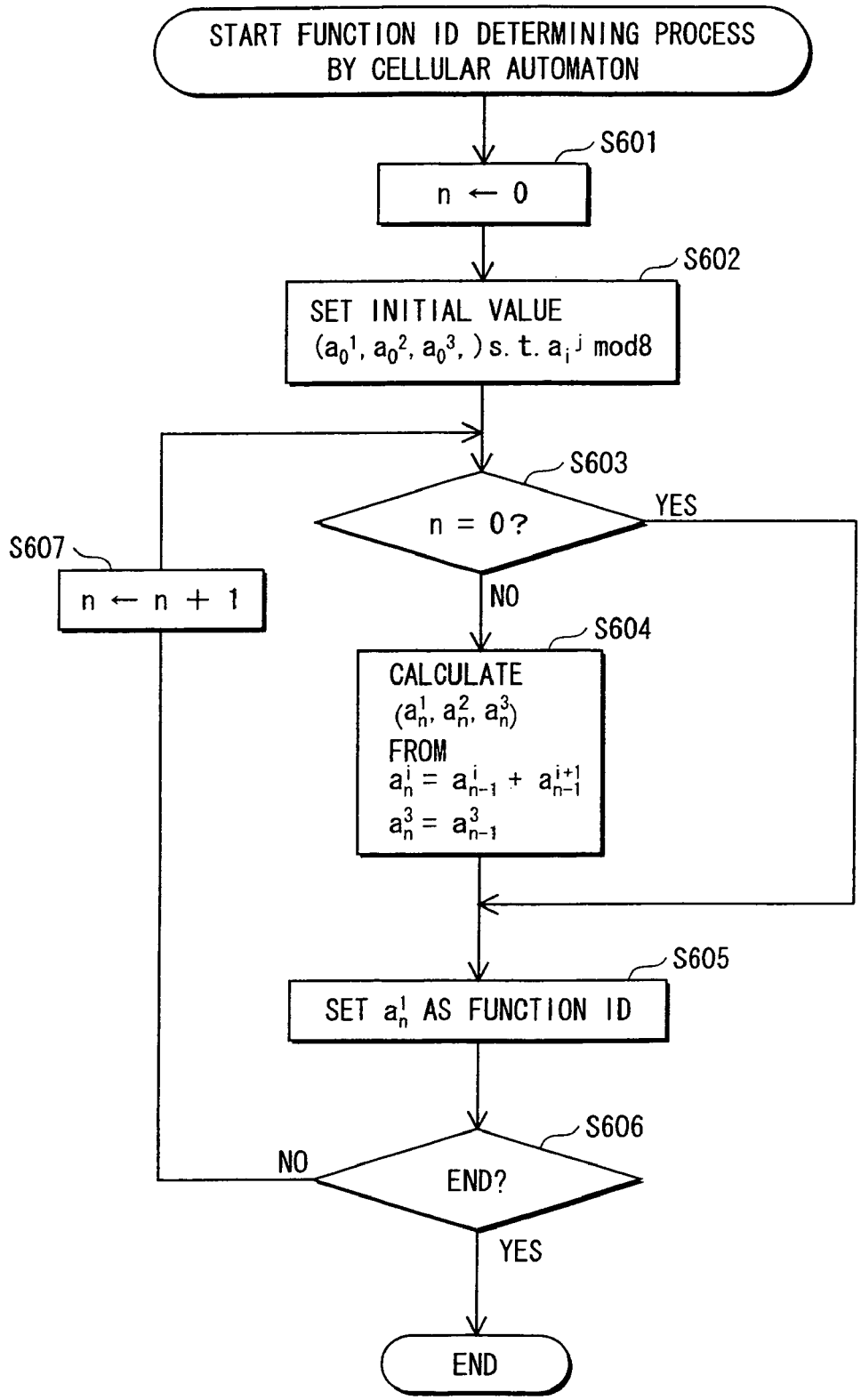
FIG. 28 is a flowchart showing, as a modified example, operations for deciding function IDs by the program execution apparatus using a cellular automaton.

Here is described a method of sequentially deciding function IDs of functions to be called and deciding a call order in accordance with the order of the decided function IDs using the cellular automaton, with the aid of FIGS. 28, 29 and 30.

FIG. 28 is a flowchart showing a procedure of deciding function IDs using a cellular automaton.

First, n=0 is set (Step S601), and then an initial value $(a_0^1, a_0^2, a_0^3)$ s.t. $a_n^j$ mod 8 of $(a_n^1, a_n^2, a_n^3)$ is set (Step S602).

Here, $(a_n^1, a_n^2, a_n^3)$ represents a state after a lapse of n from the initial value $(a_0^1, a_0^2, a_0^3)$.

When n=0 (YES in Step S603), the procedure moves to Step S605. When n≠0 (NO in Step S603), $(a_n^1, a_n^2, a_n^3)$ is calculated from $a_n^i = a_{n-1}^i + a_{n-1}^{i+1}$ and $a_n^3 = a_{n-1}^3$ (Step S604).

$a_n^1$ calculated in Step S604 is set as a function ID (Step S605). All functions to be processed are called, and whether to end the procedure is judged. When it is determined to end the procedure (YES in Step S606), the function ID determining process using the cellular automaton is finished.

When it is determined not to end the procedure (NO in Step S606), n is changed to n+1 (Step S607) and the procedure moves to Step S603 and is proceeded.

A table 500 shown in FIG. 29 is a table created by compiling each element $(a_n^1, a_n^2, a_n^3)$ of n=1 to n=20 calculated in accordance with the flowchart of FIG. 28 with the initial values of $a_0^1=1$, $a_0^2=0$ and $a_0^3=1$.

A table 600 shown in FIG. 30 shows a specific example of the order of functions to be executed when each element is calculated as in the table 500 of FIG. 29 and $a_n^1$ is the function ID. According to the figure, when the cellular automaton is used with the initial values of $a_0^1=1$, $a_0^2=0$ and $a_0^3=1$, the functions are executed in the order of funcA, funcC, funcDummy, funcB and funcD.

(3) In Embodiment 3, the program testing apparatus extracts only patterns that operate appropriately and the program execution apparatus stores only the appropriately-operating patterns; however, such configuration is dispensable for the present invention. The present invention includes the case in which the program testing apparatus detects, for example, only patterns that operate inappropriately and the program execution apparatus stores a list of inappropriately-operating patterns. In this case, the program execution apparatus generates a random number at the execution, and judges whether the generated random number is included in the list of inappropriately-operating patterns. When it is not included therein, the program execution apparatus decides a function ID using the generated random number as the initial value. When the generated random number is included in the list, the program execution apparatus generates a different random number. The program execution apparatus continues the generation of a random number until generating a random number not included in the list.

(4) In Embodiment 3, the program generation apparatus 10b and program testing apparatus 40b are individually realized using two discrete apparatuses; however, such a configuration is not essential, and the present invention may be realized with a single apparatus having functions of both program generation apparatus 10b and program testing apparatus 40b.

(5) When the original program includes branching, the program generation apparatus may perform a redundant process that adds constants and variables to the original program so as to transform the original program to one having no branching. In addition, a redundant process may be performed in order to introduce complexity into the original program.

(6) In the above embodiments, the call order determined at the execution is on a function basis and a function is the target of each call; however, the present invention is not limited to a function. The present invention includes the case where the target of each call is a process block having an arbitrary size which allows for the parallel process.

(7) Embodiment 1 above has a configuration in which the program execution apparatus 20 generates a random number at the execution and assigns the generated random number into the initial value b of an algorithm of a pseudo-random number generation called the linear congruential method; however, the initial value b is not limited to a random number generated by the program execution apparatus 20 so long as it is a random number different for each execution process.

For example, the program execution apparatus 20 may tell time at the execution and set b based on the time, or may read a value held in a specified storage area and set b based on the value.

(8) The function call order-determining program 150 may include multiple methods of determining the call order of functions. In this case, it is structured so that one method is selected from the multiple function call order deciding methods in accordance with a random number generated by the program execution apparatus at the execution.

(9) The above embodiments has a configuration in which the entire original program is converted into functions, the function call program 140 and function call order-determining program 150 are generated, and all functions are called using these programs; however, the present invention includes the case in which the above-mentioned technology is applied only to parallel processable portions in the original program. In this case, 151 for storing the call state of the function call order-determining program 150 is not required.

(10) The program generation apparatus may be structured so as to generate the function call order-determining program 150 that includes an equation for generating an address, instead of generating the function call order-determining program 150 that includes an equation for generating a pseudo random number. In this case, the program execution apparatus does not have to generate and store the function ID table 220, and may use an offset when calling a function.

(11) In the above embodiments, the storage apparatus which is an optical disk is used when the program is transferred among the program generation apparatus, program testing apparatus and program execution apparatus; however, the present invention is not limited to the case of transferring the program using a storage apparatus like an optical disk and may use a different method. For example, the program may be transmitted and received via a network.

(12) Embodiment 3 above has a configuration in which the program testing apparatus 40b judges, when a program is executed based on an initial value, whether the output value matches the execution result of the original program, and determines the execution is an "appropriate operation" when the two are determined to match while determining the execution is an "inappropriate operation" when they are determined not to match; however, the present invention is not limited to this method of judging whether a program operate appropriately or not.

For example, the program testing apparatus executes a program based on each initial value, and measures the execution time, which is a time period from the execution start to the end. The program testing apparatus may be configured so as to determine the execution is an inappropriate operation when the measured execution time is a predetermined time period or more, and to determine the execution is an appropriate operation when the execution time is less than the predetermined time.

Alternatively, the program testing apparatus may make judgments of appropriate and inappropriate operations using the method shown in the above embodiments together with the method of measuring the execution time.

(13) Embodiments 2 and 3 have a configuration in which the program execution apparatus stores therein multiple initial values (execution path pattern list) and generates a random number sequence from an initial value selected at the execution. However, the program execution apparatus of the present invention may generate multiple random number sequences from multiple initial values in advance, stores therein the multiple random number sequences—instead of multiple initial values, and randomly selects a random number sequence at the execution.

In addition, in the case where multiple random number sequences are stored as above, these random number sequences are not generated by the program execution apparatus, but may be generated, in Embodiment 2, by the program generation apparatus and, in Embodiment 3, by the program testing apparatus

(14) In Embodiments 2 and 3 above, the program execution apparatus has a configuration in which the program execution apparatus randomly selects the initial value from the execution path pattern list; however, this configuration is not essential for the present invention, and the program execution apparatus may select the initial value from the list in the ascending order or the descending order.

In addition, as (13) above, even if the program execution apparatus stores therein multiple random number sequences, the configuration of randomly selecting a random number sequence is also dispensable.

(15) The above embodiments have a configuration in which the program generation apparatus prestores therein an original program; however, this configuration is not essential for the present invention, and the following configuration is also within the scope of the present invention: the program generation apparatus obtains an original program from outside and generates a program executable format which is an obfuscated program from the obtained original program.

(16) The present invention may be a method of accomplishing the above system. The present invention may be a computer program that achieves the method by a computer, or may be a digital signal representing the computer program.

The present invention may also be achieved by a computer-readable recording medium, such as a flexible disk, a hard disk, a CD-ROM, an MO disk, a DVD, a DVD-ROM, a DVD-RAM, a BD (Blu-ray Disk), or a semiconductor memory, on which the above-mentioned computer program or digital signal is recorded. The present invention may also be the computer program or the digital signal recorded on such a storage medium.

The present invention may also be the computer program or digital signal to be transmitted via networks, as represented by telecommunications, wire/wireless communications, and the Internet, or via data broadcasting.

The present invention may also be a computer system having a microprocessor and memory, wherein the memory stores the computer program and the microprocessor operates according to the computer program.

The computer program or digital signal may be recorded on the above storage medium and transferred to an independent computer system, or alternatively, may be transferred to an independent computer system via the above network. Then, the independent computer system may execute the computer program or digital signal.

(17) The present invention also includes the case where part or all of the functional blocks making up the program generation apparatuses 10, 10a, and 10b, the program execution apparatuses 20, 20a, and 20b, and the program testing apparatus 40b of the above embodiments may be assembled as an integrated circuit, an LSI. These may be separately integrated on one chip, or part or all of them may be integrated on one chip. Although the integrated circuit is referred to here as system LSI, it may be also referred to as IC, LSI, super LSI, and ultra LSI, depending on the degree of integration.

In addition, the method for assembling integrated circuits is not limited to LSI, and a dedicated communication circuit or a general-purpose processor may be used to achieve this. A FPGA (Field Programmable Gate Array), which is programmable after the LSI is manufactured, or a reconfigurable processor, which allows reconfiguration of the connection and setting of circuit cells inside the LSI, may be used.

If technology for forming integrated circuits that replaces LSIs is introduced, owing to advance in semiconductor technology or different technology derived therefrom, the integration of functional blocks may naturally be accomplished using such technology. There is also a possibility of application of biotechnology to the integrated circuit technology.

The present invention includes a structure in which two or more of the above embodiments and modifications are combined.

The present invention can be used as a mechanism for generating execution formats of programs difficult to be analyzed by users in industries which manufacture and sell apparatuses having therein programs undesirable to be analyzed by people other than authorized users.

The invention claimed is:
1. A program generation apparatus, comprising:
a non-transitory memory storing a program which when executed by a processor causes the program generation apparatus to operates as:
an acquisition unit operable to acquire a 1st program including one or more instructions, the 1st program causing a process by executing the one or more instructions in a predetermined order to obtain a result;
a generation unit operable to generate a 2nd program based on the 1st program; and
an output unit operable to output the 2nd program, wherein
the 2nd program causes a process that is different from a process caused by the 1st program and varies according to current information in order to obtain a result identical to the result of the 1st program, the current information being determined at execution of the 2nd program and varying upon each execution,
the generation unit includes:
a detection subunit operable to detect a plurality of parallel instructions among the one or more instructions of the 1st program, the plurality of parallel instructions having no dependency on each other;
an identity instruction generation subunit operable to generate one or more identity instructions, each of which includes one or more instructions that (i) are different from one or more original instructions among the one or more instructions of the 1st program and (ii) output a result identical to a result output from the one or more original instructions; and
a dummy instruction generation subunit operable to generate a dummy instruction that is an instruction having no influence on the result of the 2nd program, and
the generation unit generates the 2nd program that causes the process by executing instructions equivalent to the one or more instructions of the 1st program (i) with instructions identical to the parallel instructions executed in an order varying according to the current information, (ii) with either one of the one or more instructions identical to the one or more original instructions or the one or more identity instructions executed, the one of the one or more original instructions and the one or more identity instructions being selected according to the current information, and (iii) in addition to the dummy instruction executed at a timing that varies according to the current information, and
the generation unit further includes an identifier assigning subunit operable to assign identifiers to (i) the one or more instructions of the $1^{st}$ program, (ii) the one or more identity instructions generated by the identity instruction generation subunit, and (iii) the dummy instruction generated by the dummy instruction generation subunit, each of the identifiers uniquely identifying an instruction, and
generates the $2^{nd}$ program that obtains instructions identified by identifiers, each of which matches a different element of a random number sequence generated according to the current information.

2. The program generation apparatus of claim 1, wherein the generation unit generates the $2^{nd}$ program that includes a random number sequence generation algorithm used for generating the random number sequence according to the current information.

3. The program generation apparatus of claim 1, wherein the generation unit generates the $2^{nd}$ program that includes a plurality of random number sequence generation algorithms used for generating a random number sequence according to the current information, selects one of the random number sequence generation algorithms at the execution of the $2^{nd}$ program, and obtains instructions identified by identifiers, each of which matches a different element of a random number sequence generated according to the selected random number sequence generation algorithm.

4. The program generation apparatus of claim 1, wherein the generation unit further includes:
a function data generation subunit operable to convert, into a function, each of the one or more instructions of the $1^{st}$ program, the identity instructions generated by the identity instruction generation subunit, and the dummy instruction generated by the dummy instruction generation subunit in order to generate function data including a plurality of functions;
an identifier assigning subunit operable to assign identifiers to the functions of the function data generated by the function data generation subunit, each of the identifiers uniquely identifying one of the functions; and
a call program generation subunit operable to generate a call program that includes a random number sequence generation algorithm used for generating a random number sequence according to the current information, and instructs to obtain and execute, among functions identified by identifiers each of which matches a different element of the generated random number sequence, functions conforming to a condition for obtaining the result identical to the result of the $1^{st}$ program, and
generates the $2^{nd}$ program that includes the function data and the call program.

5. The program generation apparatus of claim 4, wherein the plurality of functions each belong to at least one of a parallel group including functions to be executed in an order randomly decided at execution, a sequential group including functions to be executed in a sequential order at execution, an identity group including functions, one of which is randomly selected at execution and executed, and a dummy group including functions to be randomly decided whether to be executed at execution, and to be executed when decided to be executed, and
the call program generation subunit detects, for each of the plurality of functions, a group to which the each of the plurality of functions belongs, and generates the call program instructing to obtain the plurality of functions in an order according to the condition based on a result of the detection.

6. The program generation apparatus of claim 1, further comprising:
a candidate information generation unit operable to generate a plurality of pieces of candidate information, each of which is a candidate for the current information, wherein
the output unit outputs a plurality of appropriate candidate information pieces together with the $2^{nd}$ program.

7. The program generation apparatus of claim 6, further comprising:
a testing unit operable to judge, with respect to each of the generated candidate information pieces, whether an action according to the candidate information piece is appropriate, wherein
the output unit extracts and outputs only candidate information pieces that are determined by the testing unit to result in an appropriate action.

8. The program generation apparatus of claim 7, wherein the testing unit includes:
a $1^{st}$ acquisition subunit operable to acquire a $1^{st}$ value obtained by executing the $1^{st}$ program;
a $2^{nd}$ acquisition subunit operable to acquire a $2^{nd}$ value obtained by performing an action according to a candidate information piece; and
a comparative judgment subunit operable to compare the $1^{st}$ value and the $2^{nd}$ value, and determine, if the $1^{st}$ and $2^{nd}$ values match each other, that the action performed according to the candidate information is appropriate.

9. A program execution apparatus comprising the program generation apparatus of claim 1, configured to execute the 2nd program generated by the program generation apparatus of claim 6, further comprising:
an acquisition unit operable to acquire the 2nd program;
an information specifying unit operable to specify the current information at execution of the 2nd program; and
an execution unit operable to obtain and execute instructions identified by identifiers which matches a different element of a random number sequence generated according to the current information specified by the information specifying unit at execution of the 2nd program.

10. The program execution apparatus of claim 9, wherein the acquisition unit acquires a plurality of pieces of candidate information, each of which is a candidate for the current information, and
the information specifying unit selects one of the candidate information pieces.

11. The program execution apparatus of claim 10, wherein the information specifying unit generates a random number, and selects one of the candidate information pieces using the generated random number.

12. The program execution apparatus of claim 10 that executes the $2^{nd}$ program a plurality of times, wherein the information specifying unit includes:
a storage subunit operable to store therein a candidate information piece having been selected; and
a control subunit operable to perform a control to select an unselected candidate information piece by referring to the storage subunit.

13. The program execution apparatus of claim 9, further comprising:
a $1^{st}$ acquisition unit operable to acquire a $1^{st}$ value obtained by executing the $1^{st}$ program;
a comparative judgment unit operable to compare the $1^{st}$ value with a $2^{nd}$ value which is a result obtained by executing the $2^{nd}$ program by the execution unit, and judge whether the $1^{st}$ value and the $2^{nd}$ value match each other; and
a recording unit operable to record, if the $1^{st}$ and $2^{nd}$ values are determined by the comparative judgment unit to match each other, the candidate information piece selected by the information specifying unit.

14. The program execution apparatus of claim 13, wherein processes performed by the information specifying unit, the execution unit, the comparative judgment unit, and the recording unit are executed a plurality of times, and
a list including therein a plurality of candidate information pieces recorded by the recording unit is generated and then output.

15. An information processing system comprising a program generation apparatus and a program execution apparatus, wherein the program generation apparatus includes:
    a non-transitory memory storing a program which when executed by a processor causes the program generation apparatus to operates as:
    an acquisition unit operable to acquire a $1^{st}$ program including one or more instructions, the $1^{st}$ program causing a process by executing the one or more instructions in a predetermined order to obtain a result;
    a generation unit operable to generate a $2^{nd}$ program based on the $1^{st}$ program; and
    an output unit operable to output the $2^{nd}$ program,
    the $2^{nd}$ program causes a process that is different from the process caused by the $1^{st}$ program and varies according to current information determined at execution of the $2^{nd}$ program in order to obtain a result identical to the result of the $1^{st}$ program, the current information being determined at execution of the 2nd program and varying upon each execution,
    the generation unit includes:
        a detection subunit operable to detect a plurality of parallel instructions among the one or more instructions of the 1st program, the plurality of parallel instructions having no dependency with each other;
        an identity instruction generation subunit operable to generate one or more identity instructions, each of which includes one or more instructions that (i) are different from one or more original instructions among the one or more instructions of the 1st program and (ii) output a result identical to a result output from the one or more original instructions; and
        a dummy instruction generation subunit operable to generate a dummy instruction that is an instruction having no influence on the result of the 2nd program, and
    the generation unit generates the 2nd program that causes the process by executing instructions equivalent to the one or more instructions of the 1st program (i) with instructions identical to the plurality of parallel instructions executed in an order varying according to the current information, and (ii) with either one of instructions identical to the one or more original instructions or the one or more identity instructions executed, the one of the one or more original instructions and the one or more identity instructions being selected according to the current information, (iii) in addition to the dummy instruction executed at a timing that varies according to the current information, and
    the generation unit further includes an identifier assigning subunit operable to assign identifiers to the one or more instructions of the 1st program, the one or more identity instructions generated by the identity instruction generation subunit, the dummy instruction generated by the dummy instruction generation subunit, each of the identifiers uniquely identifying an instruction, and
    generates the 2nd program that obtains instructions identified by identifiers, each of which matches a different element of a random number sequence generated according to the current information, and
    the program execution apparatus includes:
        a $2^{nd}$ acquisition unit operable to acquire the $2^{nd}$ program;
        an information specifying unit operable to specify the current information; and
        an execution unit operable to execute the $2^{nd}$ program.

16. The information processing system of claim 15, wherein
    in the program generation apparatus,
        the generation unit generates a plurality of pieces of candidate information, each of which is a candidate for the current information, and
        the output unit outputs the candidate information pieces together with the $2^{nd}$ program, and
    in the program execution apparatus,
        the acquisition unit acquires the candidate information pieces, and
        the information specifying unit selects one of the candidate information pieces.

17. A program generation method used on a program generation apparatus, comprising:
    an acquisition step of acquiring a $1^{st}$ program including one or more instructions, the $1^{st}$ program causing a process by executing the one or more instructions in a predetermined order to obtain a result;
    a generation step of generating a $2^{nd}$ program based on the $1^{st}$ program; and
    an output step of outputting the $2^{nd}$ program, wherein
        the $2^{nd}$ program causes a process that is different from the process caused by the $1^{st}$ program and varies according to current information determined at execution of the $2^{nd}$ program in order to obtain a result identical to the result of the $1^{st}$ program, the current information being determined at execution of the 2nd program and varying upon each execution, and
        the generation step includes:
            a detection sub-step of detecting a plurality of parallel instructions among the one or more instructions of the 1st program, the plurality of parallel instructions having no dependency with each other;
            an identity instruction generation sub-step of generating one or more identity instructions, each of which includes one or more instructions that (i) are different from one or more original instructions among the one or more instructions of the 1st program and (ii) output a result identical to a result output from the one or more original instructions; and
            a dummy instruction generation sub-step of generating a dummy instruction that is an instruction having no influence on the result of the 2nd program, and
        the generation step generates the 2nd program that causes the process by executing instructions equivalent to the one or more instructions of the 1st program (i) with instructions identical to the parallel instructions executed in an order varying according to the current information, and (ii) with either one of instructions identical to the one or more original instructions or the one or more identity instructions executed, the one of the one or more original instructions and the one or more identity instructions being selected according to the current information, (iii) in addition to the dummy instruction executed at a timing that varies according to the current information, and
        the generation step further includes an identifier assigning sub-step of assigning identifiers to the one or more instructions of the 1st program, the one or more identity instructions generated in the identity instruction generation sub-step, the dummy instruction generated in the dummy instruction generation sub-step, each of the identifiers uniquely identifying an instruction, and the generation step further generates the 2nd program that obtains instructions identified by identifiers, each of which matches a different element of a random number sequence generated according to the current information.

18. A non-transitory computer-readable recording medium that records thereon a computer program used on a program generation apparatus, wherein the computer program causes the program generation apparatus to execute steps comprising:

an acquisition step of acquiring a $1^{st}$ program including one or more instructions, the $1^{st}$ program causing a process by executing the one or more instructions in a predetermined order to obtain a result;

a generation step of generating a $2^{nd}$ program based on the $1^{st}$ program; and an output step of outputting the $2^{nd}$ program, and the $2^{nd}$ program causes a process that is different from the process caused by the $1^{st}$ program and varies according to current information determined at execution of the $2^{nd}$ program in order to obtain a result identical to the result of the $1^{st}$ program, the current information being determined at execution of the 2nd program and varying upon each execution, and the computer program also causes the program generation apparatus to execute the steps comprising:

a detection step of detecting a plurality of parallel instructions among the one or more instructions of the 1st program, the plurality of parallel instructions having no dependency with each other;

an identity instruction generation step of generating one or more identity instructions, each of which includes one or more instructions that (i) are different from one or more original instructions among the one or more instructions of the 1st program and (ii) output a result identical to a result output from the one or more original instructions; and a dummy instruction generation step of generating a dummy instruction that is an instruction having no influence on the result of the 2nd program, and to generate the 2nd program that causes the process by executing instructions equivalent to the one or more instructions of the 1st program (i) with instructions identical to the plurality of parallel instructions executed in an order varying according to the current information, and (ii) with either one of instructions identical to the one or more original instructions or the one or more identity instructions executed, the one of the one or more original instructions and the one or more identity instructions being selected according to the current information, (iii) in addition to the dummy instruction executed at a timing that varies according to the current information, and the computer program further causes the program generation apparatus to execute:

an identifier assigning step of assigning identifiers to the one or more instructions of the 1st program, the one or more identity instructions generated in the identity instruction generation sub-step, the dummy instruction generated in the dummy instruction generation sub-step, each of the identifiers uniquely identifying an instruction, and the computer program further causes the program generation apparatus to generate the 2nd program that obtains instructions identified by identifiers, each of which matches a different element of a random number sequence generated according to the current information.

19. An integrated circuit, comprising:

an acquisition unit operable to acquire a $1^{st}$ program including one or more instructions, the $1^{st}$ program causing a process by executing the one or more instructions in a predetermined order to obtain a result;

a generation unit operable to generate a $2^{nd}$ program based on the $1^{st}$ program; and an output unit operable to output the $2^{nd}$ program, wherein the $2^{nd}$ program causes a process that is different from the process caused by the $1^{st}$ program and varies according to current information determined at execution of the $2^{nd}$ program in order to obtain a result identical to the result of the $1^{st}$ program, the current information being determined at execution of the 2nd program and varying upon each execution, the generation unit includes:

a detection subunit operable to detect a plurality of parallel instructions among the one or more instructions of the 1st program, the plurality of parallel instructions having no dependency with each other;

an identity instruction generation subunit operable to generate one or more identity instructions, each of which includes one or more instructions that (i) are different from one or more original instructions among the one or more instructions of the 1st program and (ii) output a result identical to a result output from the one or more original instructions; and a dummy instruction generation subunit operable to generate a dummy instruction that is an instruction having no influence on the result of the 2nd program, and the generating unit generates the 2nd program that causes the process by executing instructions equivalent to the one or more instructions of the 1st program (i) with instructions identical to the parallel instructions executed in an order varying according to the current information, and (ii) with either one of instructions identical to the one or more original instructions or the one or more identity instructions executed, the one of the one or more original instructions and the one or more identity instructions being selected according to the current information, (iii) in addition to the dummy instruction executed at a timing that varies according to the current information, and the generation unit further includes an identifier assigning subunit operable to assign identifiers to the one or more instructions of the 1st program, the one or more identity instructions generated by the identity instruction generation subunit, the dummy instruction generated by the dummy instruction generation subunit, each of the identifiers uniquely identifying an instruction, and generates the 2nd program that obtains instructions identified by identifiers, each of which matches a different element of a random number sequence generated according to the current information.

* * * * *